United States Patent [19]

Hamby et al.

[11] 4,104,570
[45] Aug. 1, 1978

[54] DIGITAL CONTROL SYSTEM FOR MOTORS

[75] Inventors: Russell Hamby, Euclid; Kenneth A. Ostrander, Columbus, both of Ohio

[73] Assignee: Reliance Electric Company, Cleveland, Ohio

[21] Appl. No.: 731,642

[22] Filed: Oct. 12, 1976

[51] Int. Cl.² .............................................. A02P 5/06
[52] U.S. Cl. .................... 318/318; 318/329; 318/314
[58] Field of Search ................. 363/129, 79; 318/314, 318/318, 329

[56] References Cited

U.S. PATENT DOCUMENTS

| | | | |
|---|---|---|---|
| 3,601,674 | 8/1971 | Joslyn | 318/318 |
| 3,793,511 | 2/1974 | Bala et al. | 235/151.11 |
| 3,832,620 | 8/1974 | Pollard | 363/129 |
| 3,946,293 | 3/1976 | Feld | 318/314 |
| 4,066,874 | 1/1978 | Shaw | 235/92 CM |
| 4,066,876 | 1/1978 | Shaw et al. | 235/92 CM |

*Primary Examiner*—David Smith, Jr.
*Attorney, Agent, or Firm*—Edward C. Jason

[57] ABSTRACT

A phase-control type of closed-loop control system for motors. A reference signal generator generates a digital reference signal having a binary value which varies between first and second values n times during each a-c input voltage cycle. An error signal generator generates a digital error signal having a binary value which varies in accordance with the difference between the desired and actual values of a motor variable such as armature current. The most significant bits of the digital error signal are utilized to select the angular range within which firing signals will be applied to a phase-controlled rectifier network that is arranged to drive the motor. The least significant bits of the digital error signal are compared with the digital reference signal to determine the time, within the selected angular range, when firing signals will be applied to the controlled rectifier network. By use of this technique, the control system provides both precisely timed control events and a range of control which extends over the entire motoring and inverting regions of motor operation.

36 Claims, 15 Drawing Figures

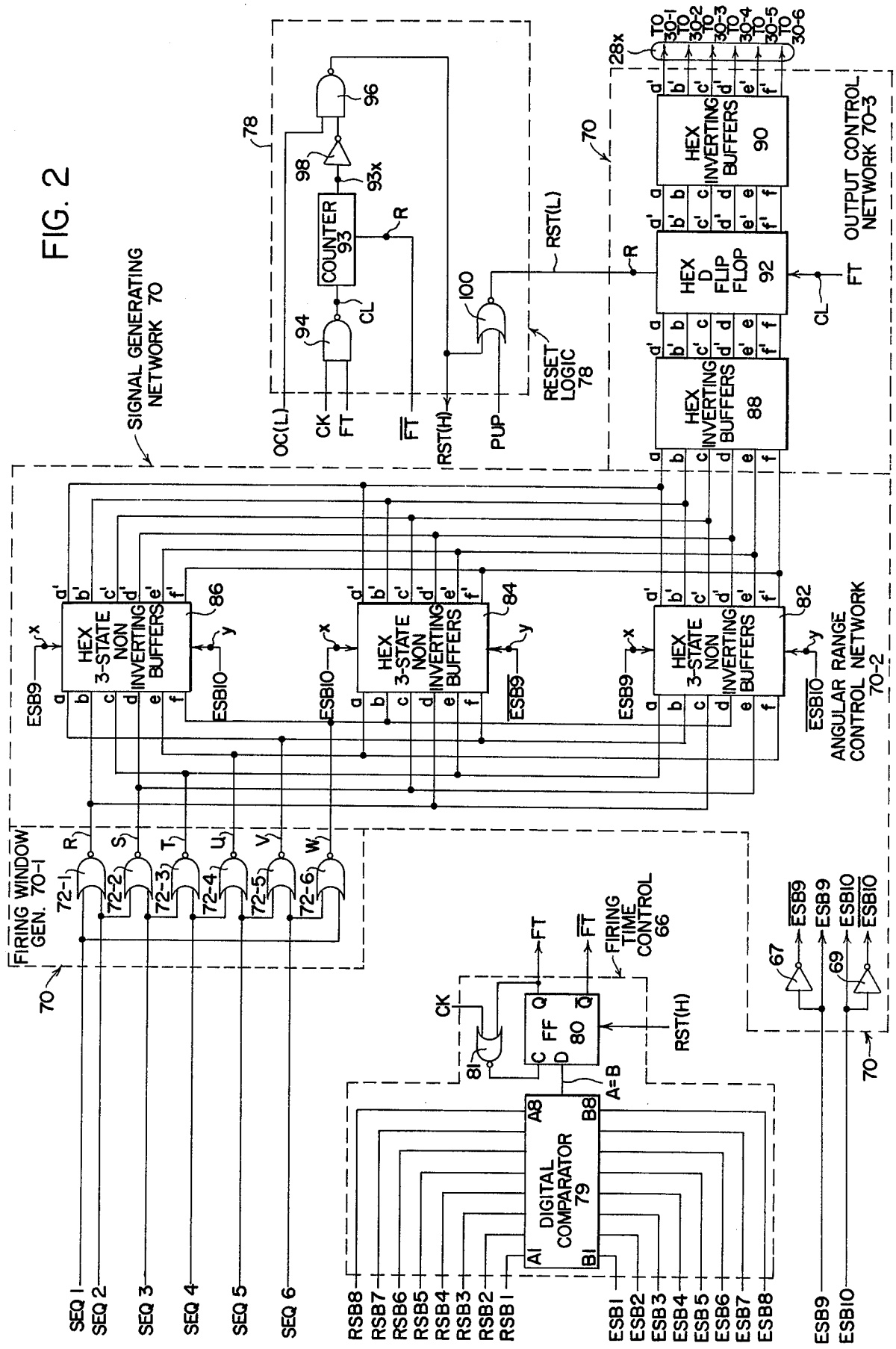

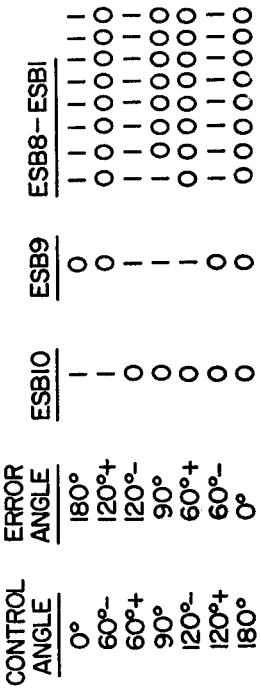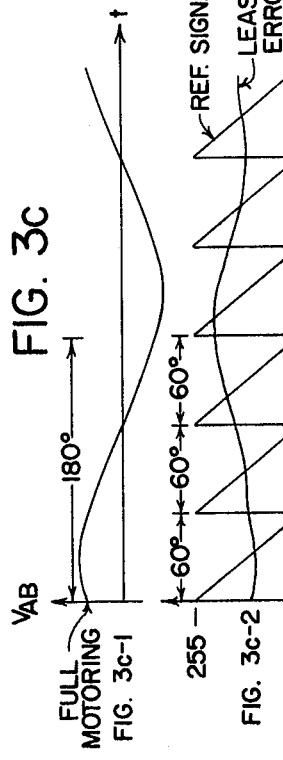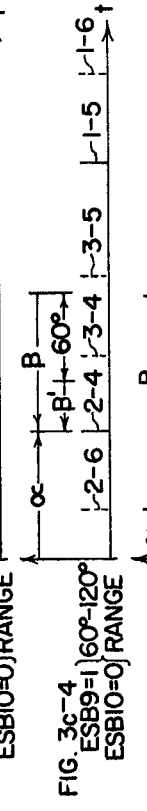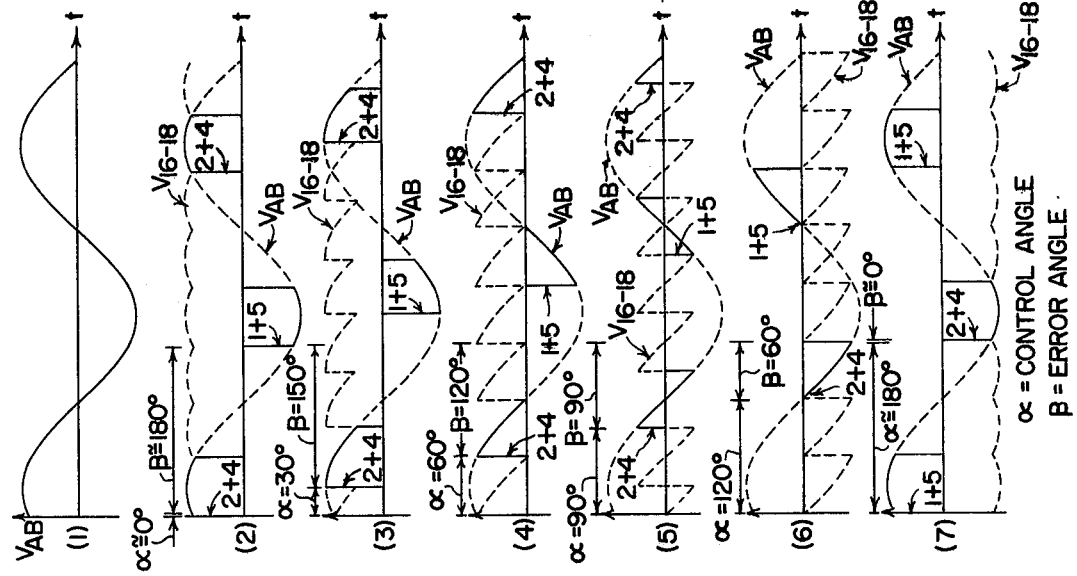
FIG. 3a
FIG. 3b
FIG. 3c

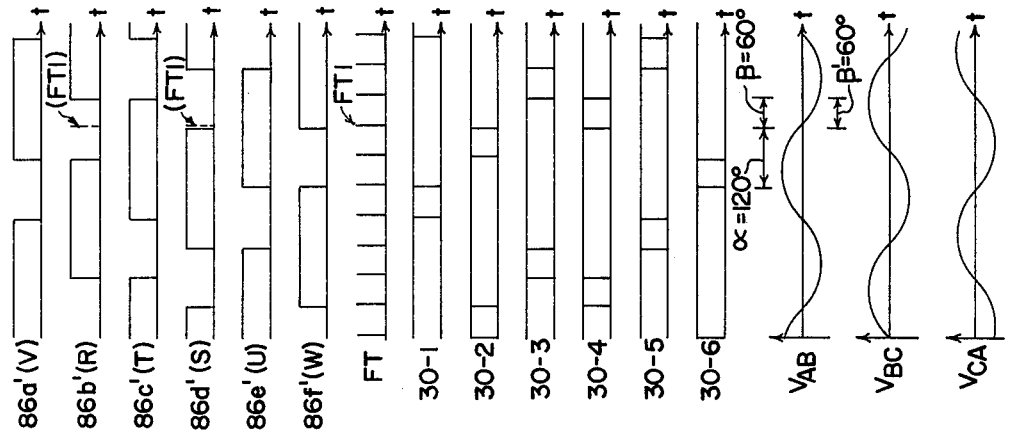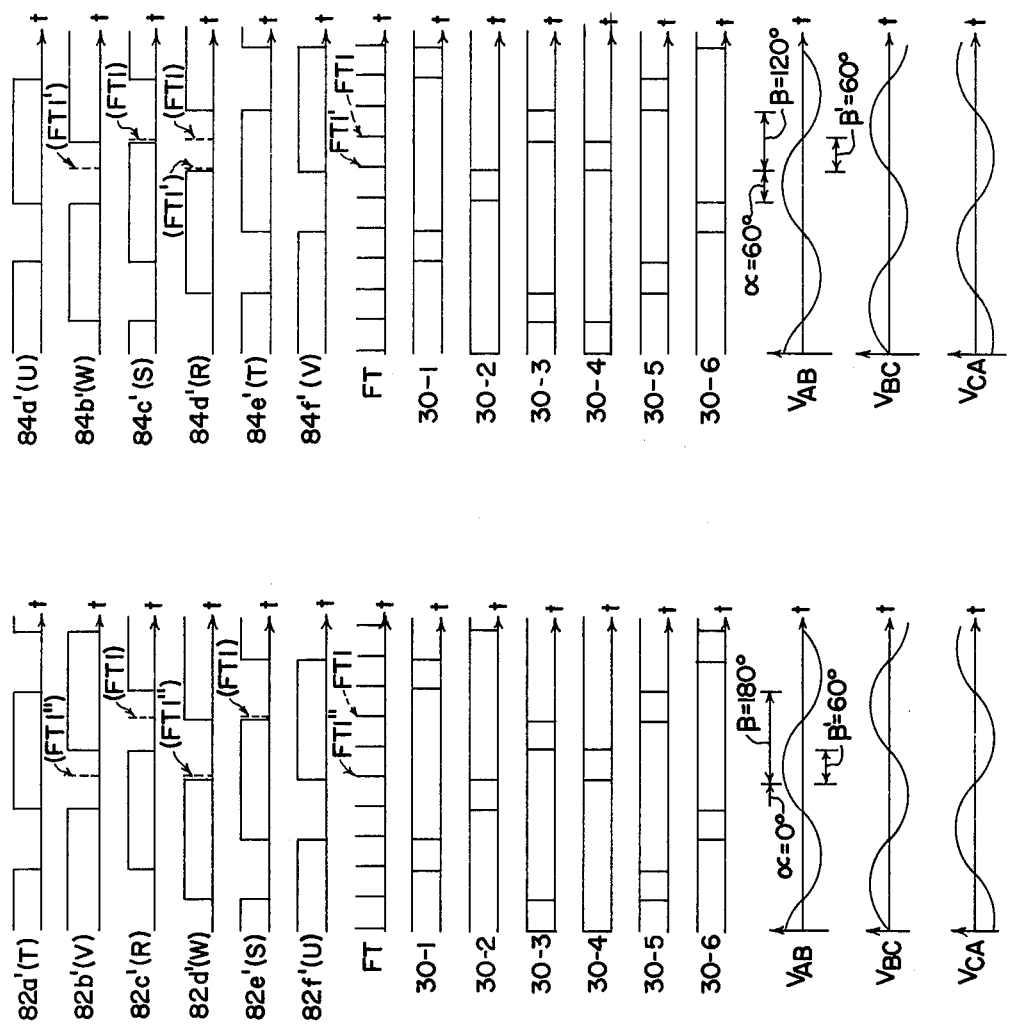

DIGITAL CONTROL SYSTEM FOR MOTORS

BACKGROUND OF THE INVENTION

The present invention relates to motor control circuits and is directed more particularly to phase-control circuitry for controlling variables such as the voltage, current, or speed of d-c motors.

One advantageous construction for a closed-loop d-c motor control system involves the utilization of a phase-controlled rectifier network such as a thyristor bridge connected between an a-c source and the armature or one of the field windings of the motor. In such circuits, the motor is controlled by controlling the firing times of the various thyristors. When, for example, firing signals are applied to the thyristors at times which are relatively early in the a-c input voltage cycle, a relatively large average value of voltage will be applied to the motor, causing the motor to operate at a relatively high speed. When, on the other hand, firing signals are applied to the thyristors at times which are relatively late in the a-c input voltage cycle, a relatively smaller average voltage will be applied to the motor, causing the motor to operate at a relativey lower speed. Thus, the motor speed is dependent upon the angle by which the thyristor firing signals lag a selected point on the input voltage waveform or, in other words, upon the control angle.

In single phase motor control systems of the above type, a typical configuration includes a full-wave thyristor bridge connected between a single-phase a-c input and the motor armature. In such systems, the control activity may include the alternate application of firing signals to the pairs of thyristors on opposite arms of the bridge at control angles of from 0° to 180° of lag behind the a-c input voltage. In practice the effect of the counter EMF of the motor causes maximum drive power to be available when the thyristor firing signals lag behind the zero crossings of the a-c input voltage by 33°.

In three-phase motor control systems of the full-wave type, a typical configuration includes a three-phase thyristor bridge connected between a three-phase a-c source and the motor armature. In such systems, the control activity includes the application of firing pulses to various pairs of thyristors, at controllable times, in a sequence including six pairs of thyristor firings for each full cycle of the a-c input voltage. For reasons similar to those stated in connection with the single phase system, maximum drive power in three-phase full-wave systems becomes available when thyristor firings lag behind the zero crossings of the a-c input voltage bu 60°.

Other common controlled rectifier configurations include the three-phase half-wave configuration and the six-phase full-wave configuration. Still another common control rectifier configuration includes pairs of parallel-connected, oppositely-poled thyristors in each a-c input lead, this configuration usually being used in half-wave type drive systems which are to have the ability to reverse the direction of motor rotation. It will be understood that the present invention can be used to control any and all of the above controlled rectifier configurations.

Prior to the present invention, it was often the practice to control the firing times of the thyristors by utilizing an analog control scheme in which a traingular wave was compared against a d-c reference voltage which had a magnitude dependent upon the difference between the actual and desired values of a motor variable. In such systems, the comparison of the triangular wave with the d-c reference voltage resulted in a pulse-width modulated signal the transitions of which were utilized to control the firing times of a controlled rectifier network. Control systems of this type are described in U.S. Pat. Nos. 2,867,763 and 3,883,786. While analog control systems of this type operate satisfactorily in a number of motor control applications, they are subject to the problems of inaccuracy of control, thermal drift, and sensitivity to component tolerances. These problems may, in turn, result in the unequal sharing of load current between thyristors and cause the overheating and premature failure of the most heavily loaded thyristors.

More recently, the utilization of digital control circuitry has alleviated certain of the problems associated with analog phase control circuitry. Accompanying these improvements, however, have been new problems such as increased sensitivity to line and environmental noise, the lack of mechanism for continuously updating the feedback data and increased circuit complexity. Another problem was that a designer had to choose between having a separate set of digital controls for each thyristor firing event or having a single set of digital controls and accepting a limit in the range of angles over which the motor could be controlled. In a three-phase full-wave controlled rectifier configuration, for example, a deisgner could, on the one hand, accept a 60° limit in the range of motor control, in which case he could utilize a single digital control circuit for all of the thyristors. On the other hand, the designer could provide desired 180° range of motor control by providing separate digital control circuits for each of the six combinations of thyristor pairs which were to be fired.

In accordance with the present invention, there is provided digital control circuitry wherein the circuitry is highly stable and insensitive to environmental noise, where the circuitry provides continuously updated feedback data and wherein the circuitry provides a full 180° range of motor control, from a single digital control circuit, without regard to the number of thyrsitors.

SUMMARY OF INVENTION

Generally speaking, the circuit of the present invention includes a reference signal generating network which generates a digital reference signal having a binary value which varies from a first to a second predetermined value n times during each full cycle of the a-c input voltage, n being an integer and being equal to the number of thyristor firing events per full cycle of the a-c input. The circuit of the invention also includes an error signal generating circuit for generating circuit for generating a digital error signal having a binary value which varies in accordance with the difference between the desired and actual values of a motor variable. Also included in the circuit of the invention is firing time control circuitry responsive to the reference signal and to the least significant bits of the error signal for generating a firing time control signal which determines the time at which each thyristor firing event will occur. Lastly, the circuit of the invention includes firing signal generating circuitry responsive to the most significant bits of the error signal for selecting that one of a plurality of ranges of control angle in which the firing time signal has its effect. This separation of the angular range selection from the firing time selection allows a single digital control circuit to control any number of thyristors over the full range of motor operation.

Another object of the invention is to provide a digital control circuit of the above character including circuitry for generating a digital error signal which is continuously updated and which has a binary value indicative of the integral of the difference between the actual and desired values of a motor variable, measured from the time of the immediately preceeding thyristor firing.

Still another object of the invention is to provide circuitry of the above character including digital comparison circuitry which initiates a firing time control signal each time that a predetermined relationship arises between the digital reference signal and the digital error signal.

It is another object of the invention to provide a digital error signal having a greater number of binary digits than the digital reference signal, the least significant bits of the error signal being compared to the reference signal to determine the firing time of the next to fire thyristors and the most significant bits of the error signal being used to select the angular range within which those thyristors will be fired.

Yet another object of the invention is to provide a circuit of the above character which is highly insensitive to noise either in the circuit environment or in the A-c voltage from which the motor is supplied.

DESCRIPTION OF THE DRAWINGS

FIG. 2 is a schematic diagram of certain of the control circuits shown in block form in FIG. 1, FIGS. 3a through 3e and 4a through 4c illustrate selected waveforms which appear in the circuits of FIGS. 1 and 2, FIGS. 5 through 7 are schematic diagrams of circuitry shown in block form in FIG. 1.

DESCRIPTION OF THE PREFERRED EMBODIMENT

Figure 1:
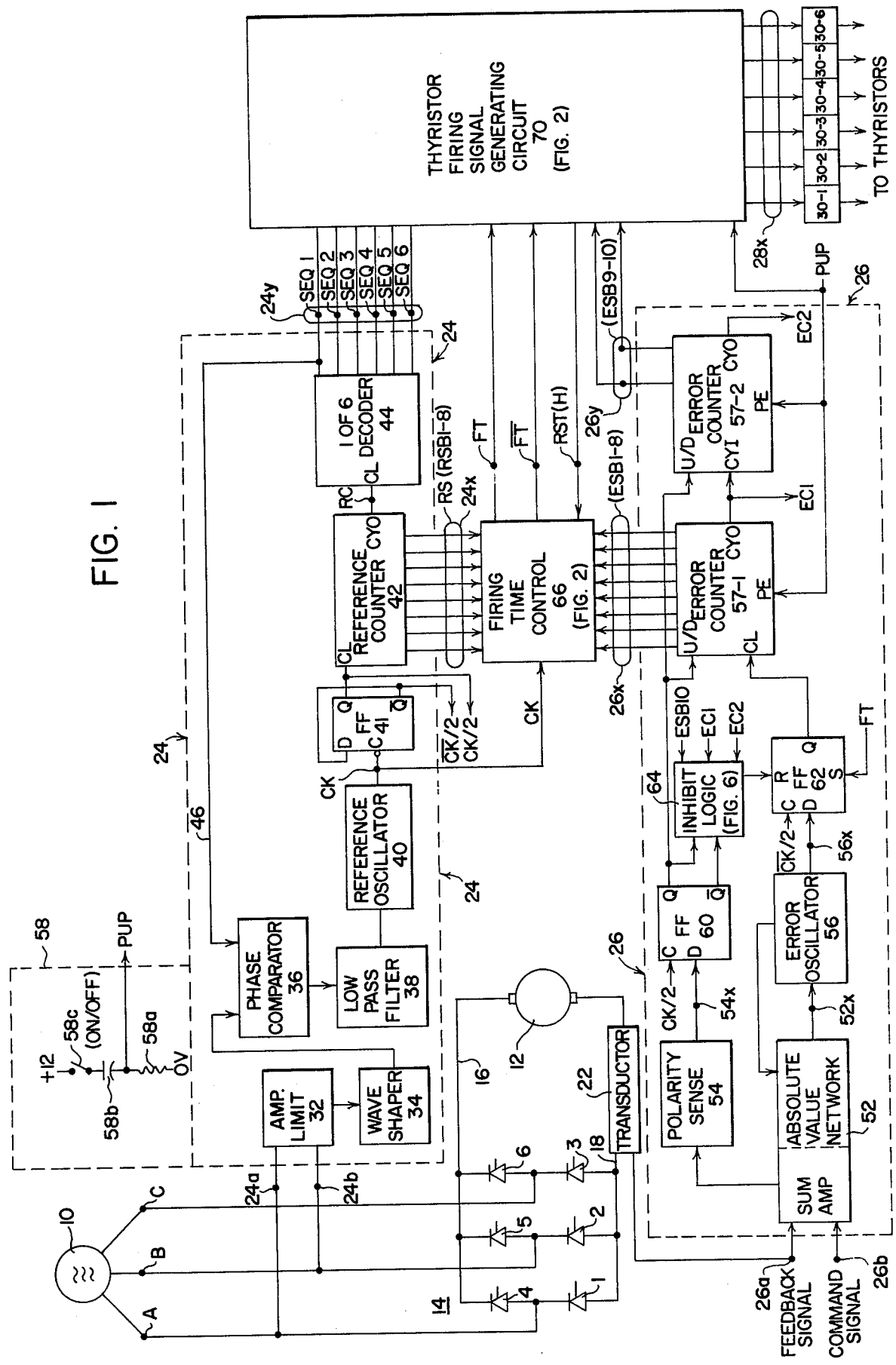
FIG. 1 is a combined block and schematic diagram of one embodiment of the circuit of the invention.

Referring to FIG. 1, there is shown a three-phase a-c source 10 for supplying voltage and current to the armature 12 of a d-c motor (not shown) through a three-phase full-wave controlled rectifier circuit 14 which includes suitable thyristors 1, 2, 3, 4, 5, and 6. Assuming that the a-c input voltage has the phase rotation A-B-C, thyristors 1 through 6 will be fired cyclically, two at a time, in the sequence 2-4, 4-3, 3-5, 5-1, 1-6 and 6-2, thyristor pairs 2-4, 3-5, and 1-6 being associated with the positive half-cycles of line-to-line voltages $V_{AB}$, $V_{BC}$, $V_{CA}$, respectively, and thyristor pairs 1-5, 2-6 and 3-4 being associated with the negative half-cycles of those line-to-line voltages. Under steady state conditions, successive pairs of these firing signals or pulses will each be separated by 60° of the a-c input voltage. The phase angle between the set firing signals as a whole and the a-c input voltages is, however, a variable quantity and will be referred to herein as the control angle.

In cycling through the above firing sequence, there is established across output leads 16 and 18 of controlled rectifier 14 a d-c voltage $V_{16-18}$ which is applied to armature 12. If thyristors 1-6 are fired relatively early in relation to the a-c input voltages, that is, if the control angle is relatively small, the d-c armature voltage will have a relatively high value. If, on the other hand, the thyristors are fired relatively late in relation to the a-c input voltages, that is, if the control angle is relatively large, the d-c armature voltage will be relatively smaller. As a result, proper selection of the control angle can cause the armature 12 to operate in any condition between a full motoring condition (source 10 delivering maximum power to armature 12) and a zero motoring condition. As will be described more fully presently, proper selection of the control angle can also cause armature 12 to operate in any condition between full inverting (armature 12 delivering maximum power to source 10) and a zero inverting condition. All of these conditions, together with various intermediate conditions, are illustrated in FIGS. 3a-1 through 3a-7.

Before discussing the waveforms of FIG. 3a, however, it is necessary to clearly define and orient the various angles shown therein. In specifying the angular position of the thyristor firing pulses, it is customary to measure the control angle with respect to a point on the input voltage other than the zero crossing of the associated line-to-line voltage wave. In a system such as the three-phase, full-wave system illustrated in FIG. 1, for example, it is customary to specify the control angle ($\alpha$) as the angle by which the thyristor firing pulses lag the 60° point of the associated line-to-line voltage wave. One reason for this choice of a reference point is that, in the three-phase full-wave controlled rectifier configuration, the 60° point represents the firing point at which source 10 makes maximum motoring power available. Given this reference point, a 0° value of control angle is associated with full motoring power and a 180° value of control angle is associated with full inverting power. Another angle which may be used to specify the position of the firing pulses is the angle ($\beta$) which will be referred to herein as the "error angle". This angle is equal to 180° minus the control angle and is equal to the angle by which the thyristor firing pulses lead the 240° point on the associated input voltage waveform. For the error angle, a value of 180° is associated with full motoring power and a value of 0° is associated with full inverting power. It will be understood that in other circuits, having different numbers of phases and different controlled rectifier configurations, the reference points for the control angle and the error angle are at other appropriate points on the associated a-c input voltage waveforms.

Referring to FIGS. 3a-1 through 3a-7 there is shown a-c input voltage $V_{AB}$ together with the pulsating d-c voltage $V_{16-18}$ which appears between controlled rectifier output leads 16 and 18 for varying values of control angle and error angle. Also shown in FIGS. 3a-2 through 3a-7 are arrows indicating various firing times for the thyristor pairs (2-4 and 1-5) which are associated with voltage $V_{AB}$. In addition, FIGS. 3a-2 through 2a-7 show in solid lines areas which indicate the portions of the voltage $V_{AB}$ which the firing of these thyristors contributes to the voltage $V_{16-18}$. Lastly, FIGS. 3a-2 through 3a-7 show the values of control angle ($\alpha$) and error angle ($\beta$) which are associated with the waveform being produced.

When, as shown in FIGS. 3a-2, the control angle is approximately 0°, i.e., when the error angle is approximately 180°, controlled rectifier 14 provides the maximum d-c motoring voltage, which voltage has a value equal to the average value of voltage $V_{16-18}$. The areas bounded by solid lines in this Figure reflect both voltage contributions made through thyristors 2 and 4 during the positive half-cycles of voltage $V_{AB}$ and voltage contributions made through thyristors 1 and 5 during the negative half-cycles of that voltage. It will be understood that the remainder of voltage $V_{16-18}$ reflects the voltage contributions provided by the remaining two phases of the a-c input voltage.

As shown in FIGS. 3a-2 through 3a-5, when the control angle increases and approaches 90°, i.e., as the error angle decreases and approaches 90°, the average value of armature terminal voltage $V_{16-18}$ prpgressively decreases until, when the control angle is equal to 90°, armature 12 is supplied with substantially no motoring voltage. Thus, control angle values from 0° to 90° encompass the entire motoring range of armature 12.

When, as shown in FIGS. 3a-6 and 3a-7, the control angle exceeds 90°, i.e., when the error angle is less than 90°, the average value of the rectified input volage becomes negative. In spite of the fact that this negative voltage tends to reverse bias thyristors 1-6, the latter thyristors will conduct if the voltage which is generated between conductors 16 and 18 by the previously established rotation of armature 12 is large enough to provide a positive voltage which overcomes the negative voltage established by source 10. The conduction of the thyristors under this condition reflects the fact that the rotating armature and the rotating equipment connected thereto are returning energy to a-c source 10 through thyristors 1-6, i.e., the motor is operating in an inverting mode. In the latter mode of operation, the return of energy to source 10 produces a braking force which slows the rotational speed of armature 12.

As the control angle increases from 90° toward 180°, the average negative value of voltage $V_{16-18}$ increases, reflecting an increase in the rate at which energy is returned to source 10 from armature 12 and an increase in the braking force on the motor. Ultimately, when the control angle reaches 180° as shown in FIGS. 3a-7, the average negative value of voltage $V_{16-18}$ is at its maximum value reflecting the full inverting condition, i.e., the maximum rate of energy return from armature 12 to source 10. Thus, the control angle values from 90° to 180° encompass the entire inverting range of armature 12.

In view of the foregoing, it will be seen that a control circuit, such as the circuit of the present invention, which can provide any control angle from 0° to 180° provides control over the entire motoring and inverting ranges of armature 12, for one direction of motor rotation. As a result, the utilization of angular control values which are less than 0° or greater than 180° (while possible) produces no result which can not also be produced by a control angle within that 180° range. One apparent exception to this rule includes directionally reversible systems, wherein angular control over more than 180° is desirable. Even in such systems, however, the angular control range for each direction of rotation need be no wider than 180°.

In controlling armature 12, it is desirable to cause one or more of the variables associated therewith to conform itself to an externally set command value. If, for example, it is desirable to cause the armature current to conform itself to an externally set current command signal, this may be accomplished by deriving a suitable armature current feedback signal, comparing that signal with current command signal and utilizing the difference as an error signal to control the armature current. If, on the other hand, it is desirable to control the armature voltage, an armature voltage feedback signal may be compared with a voltage command signal and the resulting error signal used to control the armature voltage. In the illustrative embodiment shown in FIGS. 1 and 2, the selected motor variable is the armature current. It will, however, be understood that control in accordance with any other motor circuit variable such as speed or torque may be accomplished in a similar manner, provided that appropriate feedback signal generating circuitry is substituted for the illustrated current feedback generating circuitry.

To the end that the circuitry of FIGS. 1 and 2 may control the firing of thyristors 1 through 6 in accordance with the feedback signal derived from a suitable armature current feedback device such as a transductor 22 and a suitable current command signal, the circuit of FIGS. 1 and 2 includes a reference signal generating network 24, an error signal generating network 26, a firing time control circuit 66 and a firing signal generating circuit 70. Reference generator 24 generates a periodic, digital reference signal that is locked in phase with the a-c input voltages, the reference signal having a value which varies at a uniform rate between first and second predetermined values n times during each a-c input cycle, $n$ being an integer and in the present embodiment being six. Error signal generator 26 serves to generate a digital error signal having a binary value which, in the present embodiment, changes upwardly or downwardly in accordance with the difference between the current command and current feedback signals. Firing time control circuit 66 uses the reference signal and the least significant bits of the error signal to set the firing time for each thyristor pair. Firing signal generating circuit 70 uses the most significant bits of the error signal to select that one of three possible 60° ranges of control angle within which the firing time signal is allowed to have its effect. Thus, the least and most significant bits of the error signal together uniquely determine the control angle called for by the feedback and command signals.

Referring to FIG. 1, reference signal generator 24 includes inputs 24a and 24b for sensing the phase position of the a-c input voltages, and a set of outputs 24x for providing an 8 bit digital reference signal RS, the binary value of which provides a substantially continuous indication of the progress of the input voltage through its period. The least significant bit of this signal is designated RSB1 and the most significant bit of this signal is designated RSB8. As will be explained more fully presently, reference signal RS may have more than 8 bits if it is desirable for the control system of the invention to have greater angular resolution than that provided by the illustrated 8 bit system. Reference signal generator 24 also includes a set of outputs 24y for providing a set of sequencing signals SEQ1 through SEQ6 which provide to firing signal generating circuit 70 information as to the number of thyristor firings which are to occur during each full cycle of the a-c input voltage.

In the present embodiment, the digital reference signal is a downward counting signal which assumes each binary value between 255 and zero during each 60° of the a-c input voltage. The sequencing signals SEQ1 through SEQ6 each assume their high states during respective 60° segments of the a-c input voltage, each of these six high state conditions being associated with one counting cycle of the reference signal and with one of the six thyristor firing events per cycle.

As shown in FIG. 1, error signal generator 26 includes an input 26a for receiving a feedback signal which varies in accordance with the current through armature 12 and an input 26b for receiving a current command signal indicative of the desired value of the armature current. Error signal generator 26 also includes outputs 26x and 26y which together provide a digital error signal ES having a binary value indicative of the current value of the integral of the difference between the feedback and command signals at inputs 26a and 26b, respectively. Error generator outputs 26x provide the eight least significant bits of the digital error signal ESB1 through ESB8 (bit ESB8 being most significant) and may have any binary value between 0 and 255. Error generator outputs 26y provide the two most significant bits of the digital error signal, ESB9 and ESB10, and may have the values 00, 01, and 10, bit ESB10 being most significant. As previously explained in connection with reference signal RS, the least significant bits of error signal ES may include more than 8 bits if improved angular resolution is desired. The number of least significant bits of error signal ES should, however, be maintained equal to the number of bits in reference signal RS to assure proper operation of firing time control network 66.

As shown in FIGS. 1 and 2, firing time control network 66 includes circuitry for comparing the least significant bits of error signal ES with the corresponding bits of reference signal RS and for generating a firing time signal FT during the time when the latter has a value equal to that of the former. While this firing time signal initiates each thyristor firing event, it is not by itself sufficient to determine the phase relationship between the set thyristor firing signals as a whole and the input voltage. This is because the phase relationship of the firing signals to the input voltage is determined to a greater extent by the positions (in the thyristor firing sequence) of the thyristor pairs to which the firing time signals are applied and to a lesser extent by the actual time of occurrence of these firing time signals.

Signal generating network 70 includes circuitry for utilizing various combinations of the most significant bits of error signal ES to select the respective ranges of error angle within which firing time signal FT is allowed to initiate the firing of the thyristors. In the present embodiment, the 00 state of bits ESB10 and ESB9 assures that the error angle is between 0° and 60°, the 01 state of these bits assures that the error angle is between 60° and 120° and the 10 state of these bits assures that the error angle is between 120° and 180°. Signal generating network 70 also serves to combine the firing time information conveyed by signal FT, the angular range information conveyed by error signal bits ESB9 and ESB10, and the sequencing information conveyed by signals SEQ1-6 to generate the desired sequence of thyristor firing pulses at output 28x thereof. These thyristor firing pulses are, in turn, applied to the gate-cathode circuits of thyristors 1-6 through suitable gate amplifier networks 30-1 through 30-6, respectively.

REFERENCE SIGNAL GENERATOR 24

To the end that reference generator 24 may generate the desired digital reference signal at outputs 24x thereof, and may generate the desired sequencing outputs at outputs 24y thereof, there is provided therein a phase-lock loop circuit including an amplitiude limiting network 32, a waveshaping network 34, a digital phase comparator network 36, a low pass filter 38, a voltage controlled oscillator 40, a D-type flip-flop 41, a reference counter network 42 and a decoder network 44. Amplitude limiting network 32 and waveshaping network 34 serve to provide phase comparator 36 with a 60 hertz two state signal, the transitions of which are indicative of the frequency and phase position of one of the line-to-line voltages, in this instance voltage AB. Voltage controlled oscillator 40 serves to generate a pulse train CK having a repetition rate which is proportional to the difference in phase between the signal which network 34 applies to one input of comparator 36 and the feedback signal which is applied to the other input thereof through conductor 46. The latter signal is 60 hertz two-state signal which is derived from the output of oscillator 40 through flip-flop 41, reference counter 42 and decoder 44 and is applied to comparator 36 to cause oscillator 40 to operate at a frequency that is substantially proportional to the a-c input frequency and at a phase position that is fixed with respect to the a-c input voltage. Because the operation of phase-lock loops is old and well-known, the operation thereof will not be described herein, in detail, except to the extent that reference generator 24 generates signals such as CK, CK/2, $\overline{CK}$/2, RS and SEQ1-6 which are specially adapted for use in the circuitry of the invention.

Assuming a 60 hz. input voltage at terminals 24a and 24b, the preferred arrangement of reference generator 24 includes a reference oscillator 40 which operates at 184.32 kilohertz, a flip-flop 41 which divides the oscillator output frequency by two, a reference counter 42 which further divides the oscillator output frequency by 256 and decoder 44 which divides the counter output frequency by six. This selection of frequencies and division factors is desirable because it assures that comparator 36 is supplied with input and feedback pulse trains both of which have 60 hz. repetition rates. In addition, this selection of frequencies and distribution of division factors is desirable because it causes the six outputs of decoder 44 assume their high states one at a time, in sequence, each such high state occupying 60° of the a-c input voltage, i.e., one counting cycle of reference counter 42. It will be understood, however, that other oscillator frequencies may be used, provided that suitable choices are made in the division factors of counter 42 and decoder 44.

Reference counter 42 may comprise an eight stage up/down binary counter having a clock input CL, eight binary outputs and a carry output CYO. Counter 42 may be constructed from two four-stage up/down binary counters of the type sold by RCA under the designation CD4029. In the present embodiment, counter 42 is arranged to count downwardly in 256 steps from 255 to 0 and to thereafter reestablish its initial value and begin counting down again. In addition, because decoder 44 divides the frequency of reference carry signal RC at counter output CYO by six before feeding it back to comparator 36, the counting sequence of counter 42 will repeat six times during each full cycle of the a-c input voltage. In other words, reference signal RS represents an eight bit binary number which assumes each value between 11111111 and 00000000 during each 60° of the a-c input voltage, each binary number representing 0.23° of the a-c input period. The relationship between the binary value of signal RS and a representative phase of the input voltage $V_{AB}$ is shown in FIGS. 3c-1 and 3c-2, wherein the individual steps of signal RS have not been shown because of their large number. It will be understood that if greater or lesser angular resolution is desired, the number of stages in counter 42 may be increased or decreased accordingly, provided that appropriate choices are made for the frequency of oscillator 40 and for the division factors of counter 42 and decoder 44. Generally speaking, the smaller the time constant of the motor, the greater the required angular resolution.

Figure 3D:
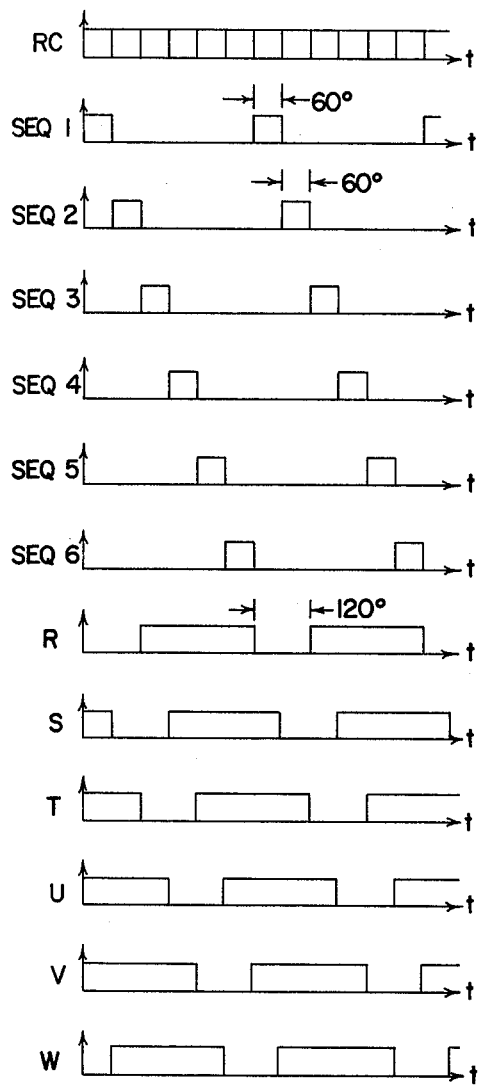

Decoder 44 may comprise a one of eight decoder of the type sold by RCA under the designation CD4022, which has been strapped so as to produce a sequence of six output states for each six pulses applied to its clock input CL. When used in this configuration, each output of decoder 44 assumes its high state for one 60° interval during each full cycle of the a-c input voltage, these high state pulses being initiated and terminated by the positive going transitions of reference carry signal RC from reference counter 42, as shown in FIG. 3d. Accordingly, it will be seen that each output of decoder 44 is in its high state during a respective 60° interval of the a-c input voltage and that during the time that any decoder output is high, reference signal RS assumes each binary value between 11111111 and 00000000.

Although decoder 44 applies to feedback conductor 46 a digital feedback signal having less than a 50% duty-cycle, this feedback signal can be directly applied to phase comparator 36, provided that the latter is not duty-cycle sensitive. One commercially available integrated circuit which includes both a comparator that is not sensitive to the duty-cycle of its input signals and a voltage controlled oscillator that is usable as oscillator 40 is sold by RCA under the designation CD4046. If the latter device is utilized in place of comparator 36 and oscillator 40, the low pass filter 38 may be provided by simply connecting suitable resistors and capacitors to those terminals of the CD4046 device which are associated with the phase comparator and the voltage controlled oscillator.

In addition to generating reference signal RS and sequencing signals SEQ1-6, reference generator 24 also generates certain supervisory signals which synchronize and enable various sections of the circuits of FIGS. 1 and 2. Among these are the system clock signal CK at the output of oscillator 40 and its half-frequency derivative clock signals CK/2 and $\overline{CK/2}$ at the outputs of flip-flop 41. All of the latter signals are used as clocks to assure proper coordination of the various signal transitions of the circuit of FIGS. 1 and 2 and thereby enhance the immunity thereof to environmental or line noise. The purposes of signals CK, CK/2 and $\overline{CK/2}$ will be described more fully later in connection with FIG. 3e and in connection with the devices which utilize them.

ERROR SIGNAL GENERATOR 26

To the end that error signal generator 26 may establish at outputs 26x and 26y a digital error signal having a binary value indicative of the current value of the integral of the difference between the current feedback signal at generator input 26a and the current command signal at generator input 26b, there is provided therein a summing and absolute value network 52, a polarity sensing network 54, voltage controlled oscillator 56 and an error counter 57, which counter may comprise first and second counter sections 57-1 and 57-2. Also included in error generator 26 are D-type flip-flops 60 and 62 which assure synchronization of the various signal transitions thereof and an inhibit logic network 64 which serves to prevent generator 26 from establishing undesired values of error signal ES.

As used herein, the term "current time-accumulated error" or "current integrated error" will be understood to mean the current or presently existing digital value of the time integral of the difference between the current feedback signal at generator input 26a and the current command signal at generator input 26b. This term has been chosen to reflect the fact that the binary value of error signal ES is continually updated either upwardly or downwardly on the basis of the time accumulated value of the difference between the feedback and command signals, measured from the last thyristor firing event. If, for example, the binary value of error signal ES were such that the difference between the current feedback signal and the current command signals were equal to zero, i.e., if the armature current was at its desired value, the current integrated value of this zero magnitude difference signal would also be equal to zero. Under these conditions, neither the binary value of error signal ES nor the armature current have any tendency to change.

If, on the other hand, error signal ES were such that thyristors 1 through 6 were being fired too late in relation to the a-c input voltage, i.e., if the armature current were too low, the positive value of the current feedback signal will be lower than the negative value of the current command signal, resulting in an effective negative difference signal. Under these conditions, polarity sense network 54 and error oscillator 56 will cause error counter 57 to increase the binary value of error signal ES in accordance with the time integral of the negative difference signal. The latter increase, in turn, causes the firing times thyristors 1 through 6 to advance in relation to the input voltage and thereby increases the armature current and causes the difference between feedback and command signals to be driven toward zero.

Similarly, if the binary value of error signal ES were such that firing signals were being applied to thyristors 1 through 6 too early in relation to the a-c input voltage, i.e., if the armature current were too high, the positive value of the current feedback signal will be greater than the negative value of the current command signal, resulting in an effective positive difference signal. Under these conditions, polarity sense network 54 and error oscillator 56 will cause error counter 57 to decrease the binary value of error signal ES in accordance with the time integral of the positive difference signal. The later decrease, in turn, causes the firing times of thyristors 1 through 6 to be retarded in relation to the input voltage and thereby reduces the armature current and causes the difference between the feedback and command signals to be driven toward zero. It will be understood that as the difference signal reaches zero, the new value of error signal ES and the new value of the armature current will remain unchanged unless there occurs either a change in the feedback signal as, for example, would accompany a change in required load power, or a manually or automatically initiated change in the current command signal.

In view of the foregoing, it will be seen that large values of error signal ES are associated with large values of error angle and early firing times for thyristors 1 through 6, and that small values of error signal ES are associated with small error angles and late firing times for the thyristors 1 through 6. The above association is in contrast with the association of large values of error signal ES with small values of the control angle and early firing times for the thyristors 1-6, and the association of small values or error signal ES with large values of control angle and with late firing times for thyristors 1-6. These relationships are summarized in FIG. 3b.

The operation of error signal generator 26 will now be described. Upon application of the current feedback signal at generator input 26a and the current command signal at generator input 26b, summing and absolute value network 52 combines the positive polarity feedback and the negative polarity command signals and establishes at output 52x thereof an analog difference signal having a positive value proportional to the difference therebetween. At the same time, polarity sensing network 54 is responsive to the output of the summing amplifier portion of network 52 to generate at output 54x thereof a two-state directional control signal which is in its high state when the feedback signal exceeds the command signal and which is in its low state when the command signal exceeds the feedback signal. Thus, networks 52 and 54 together provide an analog difference signal indicative of the magnitude of the difference between the feedback and command signals and a digital directional control signal indicative of the sign of that difference. The circuitry making up networks 52, 54 and 56 will be discussed later in connection with FIG. 5.

Figure 5:
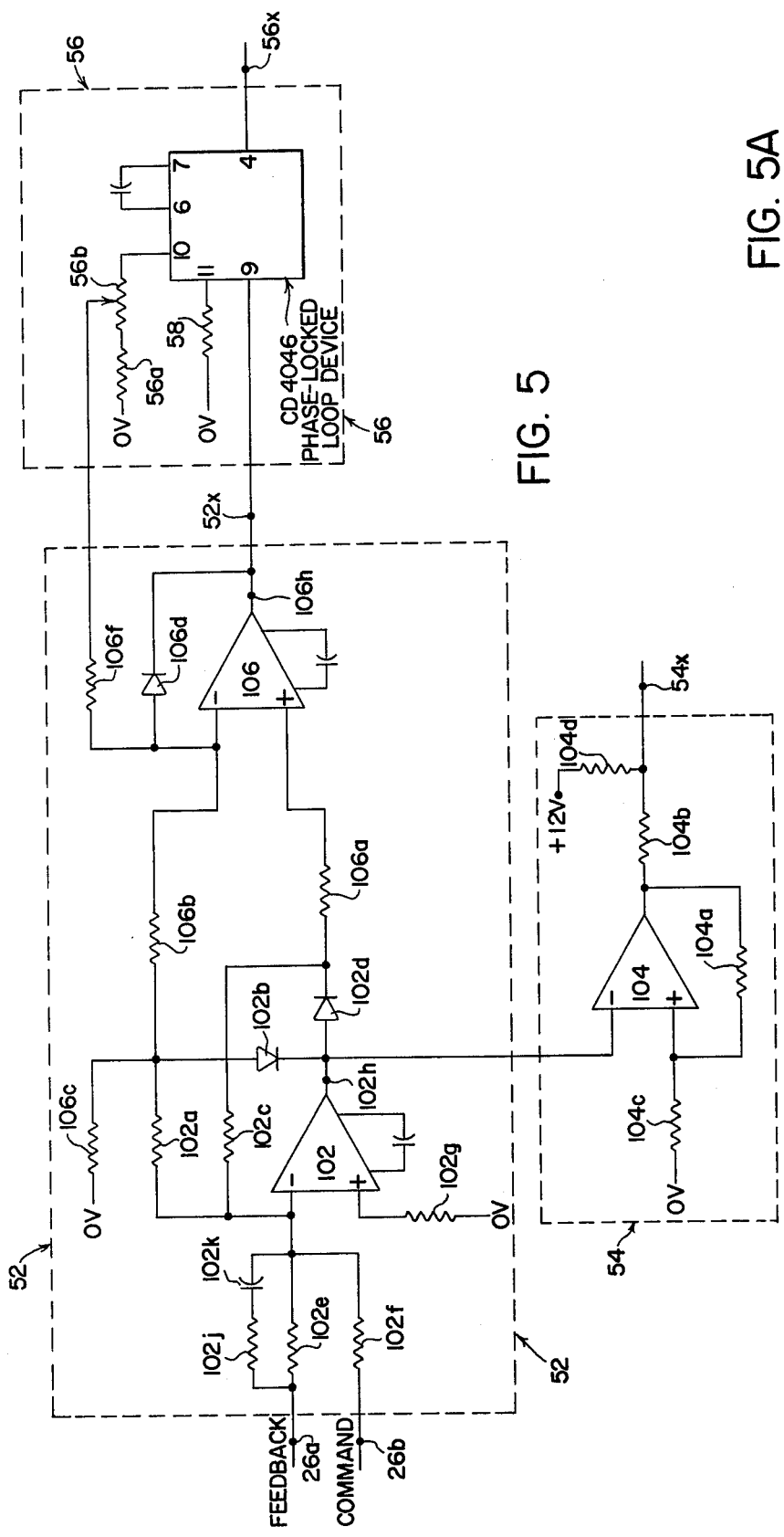

The analog difference signal appearing at the output of summing and absolute value network 52 is applied to the analog input of error oscillator 56, causing there to appear at oscillator output 56x a digital signal having a repetition rate proportional to the magnitude of the analog difference signal. (If, as shown in FIG. 5, error oscillator 56 comprises the voltage controlled oscillator portion of the phase locked loop package sold by RCA under the designation CD4046, the above proportionality is determined by the value of a resistor 58 which is connected to pin 11 of that device to establish a suitable system gain for the circuit of the invention.) Upon being clocked by signal $\overline{CK}/2$ in D-type flip-flop 62 for timing purposes, the output of oscillator 56 is applied to the clock input CL of error counter 57 to initiate changes in the count thereof. In addition, the two state directional control signal at polarity sensing network output 54x is clocked by signal CK/2 in D-type flip-flop 60 and the complement thereof is applied to up/down input U/D of counter sections 57-1 and 57-2 to select either the upward or downward direction of counting therein. More particularly, the binary value of the signal at the outputs of error counter 57 (error signal ES) increases at a rate proportional to the repetition rate of the pulse train appearing at oscillator output 56x when the signal at the U/D inputs of counter sections 57-1 and 57-2 are in their high state, and decreases at a rate proportional to the repetition rate of the pulse train appearing at oscillator output 56x when the signal at U/D inputs of counter sections 57-1 and 57-2 are in their low states. It will, therefore, be seen that any change in the binary value of error signal ES is dependent upon both the magnitude of the analog difference signal and upon the time that analog difference signal is present or, in other words, is dependent upon the time integral of the analog difference signal.

While error counter 57 is shown in FIG. 1 as having a first section 57-1 with outputs connected to error generator output 26x and a second section 57-2 having outputs connected to error generator output 26y, this division into sections does not reflect any important difference in the natures of sections 57-1 and 57-2. Error counter 57 may, for example, comprise a ten stage up/down counter the eight least significant bits of which are applied to error generator output 26x and the two most significant bits of which are applied to error generator output 26y. Alternatively, as shown in FIG. 1, error counter 57 may comprise an eight-stage binary up/down counter 57-1 (including two four-stage up/down counters of the type sold by RCA under the designation CD4029) together with an additional four-stage binary up/down counter 57-2 of the CD4029 type, the carry input CYI of which is connected to the carry output CYO of error counter section 57-1. In the latter configuration, counter section 57-2 may be considered as an overflow counter in which only the two lowest order outputs are utilized, these outputs providing error signal bits ESB9 and ESB10. The showing of two separate sections for counter 57 is, however, preferred to FIG. 1 since it emphasizes the differing utilizations of the various bits of error signal ES.

In the operation of error generator 26, D-type flip-flops 60 and 62 assure proper coordination between the counting transitions of error counter 57 and the various other signal transitions in the circuit of FIG. 1. By clocking the output of error oscillator 56 with clock signal CK/2, for example, the counting transitions of error counter 57 are made to occur between the times at which there occur counting transitions in reference counter 42. In addition, the clocking of the directional control signal at polarity sensing network output 54x with clock signal CK/2 assures that the direction of counting in error counter 57 is not changed during the time that counter 57 is changing states. One beneficial result of this clocking scheme is that any ambiguity in the binary value of error signal ES is eliminated. Another beneficial result is that the above clocking scheme improves the noise immunity of the circuit of FIG. 1.

In order to assure that, upon the turn-on of the circuit of FIGS. 1 and 2, error counter 57 is preset to a value which assures a desirable starting posture for error generator 26, FIG. 1 includes a starting network 58 which here takes the form of a resistor 58a and a capacitor 58b which are connected in series across a suitable positive 12 volt power source by a starting switch 58c. This starting network serves to generate a power-up (PUP) signal which is initially in its high or starting state and which, after the elapse of a time sufficient to allow the circuit of FIGS. 1 and 2 settle, assumes its low or running state. During the high state of signal PUP, i.e., immediately after the closure of switch 58c, various networks of the circuits of FIGS. 1 and 2 are maintained in a disabled condition (an initial preset condition) suitable for the beginning of actual operation. Thereafter, as capacitor 58b becomes charged, the occurrence of the low state of signal PUP allows the disabled networks to become enabled and allows other networks to depart from their initial or preset values.

In particular, network 58 assures that, upon turn-on, both sections of counter 57 are preset to their zero states, a condition which assures that the initial value of the error angle is 0°, i.e., a condition in which full inverting is called for. In the present embodiment, the preset condition is established by applying signal PUP to the preset enable (PE) inputs of counter sections 57-1 and 57-2. The above choice of an initial value of error angle assures that armature 12 is not supplied with motoring current until such time as the command signal indicates that motoring is called for. This choice also assures that, if motor 12 is already rotating at the time of start-up, the circuitry of the invention is able to immediately provide a braking force for stopping purposes. It will be understood that after start-up, when the current feedback signal begins to provide information as to the desired level of motoring or braking, counter 57 is released from the control of signal PUP to allow the binary value of error signal ES to increase until it arrives at the desired operating point between the full inverting condition and the full motoring condition.

In the event that it is believed desirable to have a non-zero initial value for error signal ES, this initial non-zero value may be selected by applying a continuous high state voltage to appropriate JAM inputs of the 4 stage counters making up counter 57. If, for example, an initial 90° error angle is desired (neither motoring nor inverting), this angle may be provided by connecting to the JAM inputs of counter 57 voltages which will establish the error signal bit pattern associated with the angle 90° in FIG. 3b.

Figure 6:
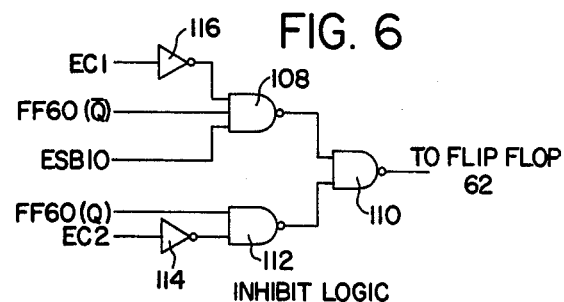

As will be described more fully later in connection with FIG. 6, inhibit logic network 64 serves, through flip-flop 62, to prevent error oscillator 56 from changing the count of error counter 57 when error signal ES has its maximum permissible binary value and the feedback circuitry attempts to further increase that value. Under the latter condition, the thyristors of controlled rectifier 14 are providing the maximum available motoring power from a-c source 10 and attempts to further increase the motoring power are ineffective. Accordingly, under this condition, inhibit logic network 64 resets flip-flop 62 and thereby prevents error oscillator 56 from changing the state of counter 57 until there occurs a change in the indicated direction of counting for error counter 57. Thus, inhibit logic network 64 serves to prevent the error angle from exceeding 180°.

Inhibit logic network 64 produces a similar effect when the error signal has its minimum permissible value and the feedback circuitry attempts to further decrease that value. Under the latter condition, controlled rectifier 14 is providing the maximum available braking power from a-c source 10 and attempts to further increase braking power are ineffective. Accordingly, under this condition inhibit logic network 64 resets flip-flop 62 and thereby prevents error oscillator 56 from changing the state of counter 57 until there occurs a change in the indicated direction of counting for error counter 57. Thus, inhibit logic network 64 serves to prevent the error angle from becoming less than 0°.

FIRING TIME CONTROL NETWORK 66

Figure 3E:
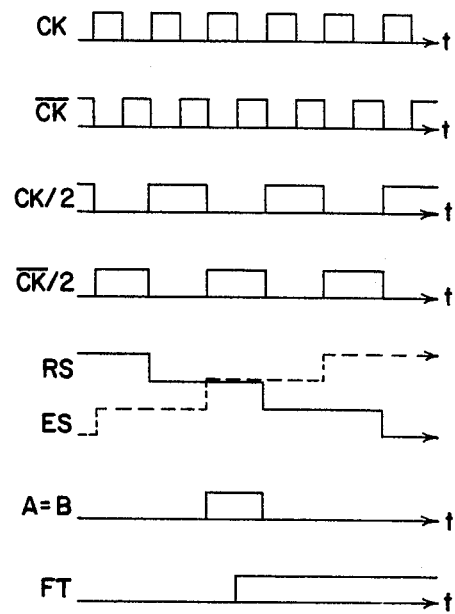

As previously explained, firing time control network 66 serves to compare reference signal RS with the least significant bits of error signal ES and to generate therefrom a raw firing time signal FT. To the end that this may be accomplished, firing time control network 66 includes, as shown in FIG. 2, an eight bit digital comparator 79 which may comprise two 4-bit digital comparators of the type sold by National Semiconductor under the designation MM74C85. Associated with comparator 79 is a D-type flip-flop 80 which serves a clocking function that assures proper time coordination of the various transitions within the circuitry of the invention. The firing time signal FT which appears at the Q output of flip-flop 80 undergoes a positive transition to initiate a thyristor firing when signal CK at Nor gate 81 undergoes a negative transition during the time that comparator 79 produces a high state signal at the A=B output thereof (assuming that signal FT was originally in its low state). In other words, as shown in FIG. 3e, each thyristor firing is initiated at a time determined by that negative going transition of signal CK which first follows the time at which the binary value of reference signal RS becomes equal to the binary value of error signal ES. The choice of the above condition as the desired firing time will now be explained.

As previously explained, the binary value of error signal ES (including both the least and the most significant bits) is a direct indication of the time at which a given thyristor should be fired. The angles which correspond to various values of error signal ES are shown in FIGS. 3c-3 through 3c-5 as the angles labeled $\beta$. Each of these values of $\beta$ is made up a whole number (0, 1 or 2) of 60° angular increments plus an angular remainder $\beta'$ which is less than 60°. In accordance with the invention, the above number of 60° increments is determined by the binary value of the most significant bits of error signal ES, while the angular remainder $\beta'$ is determined by the binary value of the least significant bits of error signal ES. In other words, the least significant bits of error signal ES determine the thyristor firing angle within the 60° range of firing angle selected by the most significant bits of error signal ES. Thus, the binary value of the least significant bits is a direct indication of the angle by which the thyristor firing preceeds the end of the 60° range of error angle in which that thyristor firing occurs.

Also as previously explained, the reference signal recurrently assumes each value between its highest binary value and its lowest binary value during each 60° segment of the a-c input voltage, such as segments $T_0$-$T_1$, $T_1$-$T_2$, etc. in FIG. 3c-2. As a result, the binary value of reference signal RS is a direct indication of the time remaining in any 60° segment of the a-c input voltage. In addition, since the 60° counting cycles of reference signal RS also define the boundaries of the 60° angular ranges of error signal ES, the binary value of reference signal RS is also a direct indication of the angle remaining in the coincident 60° range of error angle. Accordingly, the desired firing time is the time at which the binary value of reference signal RS becomes equal to the binary value of the least significant bits of error signal ES, i.e., the time when the error angle remainder $\beta'$ equals the amount of time remaining in that 60° segment. This relationship is shown in FIGS. 3c-2 through 3c-5, wherein the firing time control pulses such as those labeled 2-4 may be seen to occur at the intersection of the reference signal waveform with the waveform representative of the least significant bits of the error signal, i.e., during the time that the A=B output of comparator 79 is in its high state.

Within the time interval during which the A=B output of comparator 79 is in its high state, the time of occurrence of signal FT is further restricted by the clocking action of signal CK acting through Nor gate 81 and flip-flop 80. This clocking action by signal CK is desirable since it prevents signal FT from occurring at the same time as the transitions of signals CK/2 and $\overline{CK}/2$, which transitions change the states of reference counters 42 and 57, respectively. As a result of this clocking, a predictable and unambiguous sequence is imposed on all important signal transitions, as shown in FIG. 3e.

It will be understood that the transitions occurring at the A < B and A > B outputs of comparator 79 occur sufficiently close to those at the A=B output that these transitions may be used as substantial equivalents for those at the A=B output. The use of these transitions is, however, not preferred for purposes of the present invention.

FIRING SIGNAL GENERATING NETWORK 70

To the end that the angular range information conveyed by the most significant bits of error signal ES may be combined with the angular remainder information conveyed by signal FT and the sequencing information conveyed by sequencing signals SEQ1-6 to generate the desired sequence of thyristor firing signals, there is provided signal generating network 70. In the embodiment shown in FIG. 2, signal generating network 70 includes window generator network 70-1 which utilizes sequencing signals SEQ1 through SEQ6 to generate a sequence of firing window signals R, S, T, U, V and W that fix the maximum width of the interval or window within which each thyristor may be fired. Signal generating network 70 also includes an angular range control network 70-2 which uses most signficant bits ESB9 and ESB10 of error signal ES and firing window signals R through W to generate one of three possible sets of firing pattern signals, each set containing the information necessary to establish the desired firing sequence over a respective 60° range of firing angle. Also included in signal generating means 70 is an output control network 70-3 which combines the firing pattern information provided by networks 70-1 and 70-2 with the timing information provided by firing time control network 66 and generates therefrom the desired number of thyristor firing pulses, in the desired sequence, at the desired times. Cooperating with signal generating network 70 is a reset logic network 78 which serves the dual function of determining the duration of the firing signals applied to thyristors 1 through 6 and of generating the reset signal RST which resets the devices of FIGS. 1 and 2, after the firing of each thyristor.

In the present embodiment firing window generator 70-1 includes six, two-input NOR gates 72-1 through 72-6. Upon the application of sequencing signals SEQ1 through SEQ6 from decoder 44 of FIG. 1, gates 72-1 through 72-6 effectively combine adjacent 60° sequencing signals to establish a set of six firing window signals R through W having 120° wide low state intervals and having different phase positions with respect to the a-c input voltage. The relationship between firing window signals R through W and sequencing signals SEQ1-6 shown in FIG. 3d together with their relationship to reference counter carry signal RC. As will be described more fully presently, the low state intervals of signals R through W determine the intervals of the a-c input voltage period during which the thyristors that will be associated therewith may be fired. In the present embodiment, the 120° width of these firing windows results from the fact that in a three-phase full-wave controlled rectifier such as 14 each thyristor is fired twice in sequence during successive 60° intervals of the input voltage, as shown by the waveforms labeled 30-1 through 30-6 in FIGS. 4a, 4b and 4c. It will be understood that for controlled rectifier networks having more or less than six thyristors and for controlled rectifier networks of the half-wave configuration, it may be necessary to modify firing window generator 70-1 so that firing window signals of suitable number and width are provided.

In the present embodiment, angular range control network 70-2 includes three hexbuffer devices 82, 84 and 86, each of which may be of the type sold by National Semiconductor under the designation MM80C95. Each of these hex-buffers includes six, three-state non-inverting buffers which, when enabled, provide respective output signals that are non-inverted forms of the respective input signals and which, when disabled, provide relatively high output impedances. Hex-buffer 82, for example, includes six three-state buffers having respective inputs $a$, $b$, $c$, $d$, $e$, and $f$, having respective outputs $a'$, $b'$, $c'$, $d'$, $e'$ and $f'$, and having disable inputs $x$ and $y$. For each hex-buffer device of this type, it may be considered that the unprimed inputs are directly connected to the respective primed outputs when both of the disable inputs of that device have low state voltages applied thereto, and that the hex-buffer is effectively out of the circuit when either of the disable inputs have a high state voltage applied thereto.

In affording the desired angular range selection, each of the firing window signals R through W is applied to one input of each hex-buffer. In addition, each output of each hex-buffer is connected to similarly lettered output of each other hex-buffer and to the similarly lettered input of output control network 70-3. One result of this connection is that each hex-buffer is able to provide a complete set of six firing pattern signals to output control network 70-3. Another result of this connection is that each hex-buffer output controls a particular thyristor. More particularly, the $a'$ output of each hex-buffer is associated, through network 70-3, with thyristor 1, the $b'$ output of each hex-buffer is associated with thyristor 2, etc. This allows the order in which firing window signals R through W are applied to the different hex-buffer inputs to be chosen so that the selection of one of the three hex-buffers provides to output control network 70-3 one of three thyristor firing patterns, each of which establishes the desired thyristor firing sequence at a different phase position with respect to the input voltages.

In order to control the above selection of a thyristor firing pattern, the disable inputs of the hex-buffers are supplied with a different combination of the most significant bits of error signal ES. The disable inputs of hex-buffer 86, for example, are supplied with error signal bits ESB9 and ESB10. As a result, when these error signal bits are both in their low state, inputs $a$ through $f$ of hex-buffer 86 are effectively connected to outputs $a'$ through $f'$ thereof and, in turn, to inputs of $a$ through $f$ output control network 70-3. Similarly the disable inputs of hex-buffer 84 are supplied with error signal bit ESB10 and with the complement of error signal bit ESB9. As a result, when bit ESB9 is a 1 and bit ESB10 is a 0, inputs $a$ through $f$ of hex-buffer 84 are connected to the similarly lettered inputs of output control network 70-3. Finally, the disable inputs of hex-buffer 82 are supplied with error signal bit ESB9 and the complement of error signal bit ESB10. As a result, when error signal bit ESB9 is a 0 and error signal bit ESB10 is a 1, inputs $a$ through $f$ of hex-buffer 82 are connected to the similarly lettered inputs of output control network 70-3. Thus, each of the three different combinations of the most significant bits of error signal ES causes a respective thyristor firing pattern to be applied to the inputs of output control network 70-3.

In accordance with the present invention, the order in which window signals R through W are applied to the inputs of hex-buffer 86 is chosen so that the selection of hex-buffer 86, when error signal bits ESB9 and ESB10 are both zero, causes the error angle ($\beta$) for the firing of thyristors 1-6 to be equal to 0° plus the error angle contribution (β') of signal FT from firing time control network 66, as shown in FIG. 3c-3. Similarly, the order in which window signals R through W are applied to the inputs of hex-buffer 84 is chosen so that the selection of hex-buffer 84, when error signal bits ESB9 and ESB10 are 1 and 0, respectively, causes the error angle (β) for the firing of thyristors 1-6 to be equal to 60° plus the error angle contribution (β') of signal FT from firing time control network 66, as shown in FIG. 3c-4. Finally, the order in which window signals R through W are applied to the inputs of hex-buffer 82 is chosen so that the selection of hex-buffer 82, when error signal bits ESB9 and ESB10 are 0 and 1, respectively, causes the error angle (β) for the firing of thyristors 1-6 to be equal to 120° plus the error angle contribution (β') of signal FT from firing time control network 66, as shown in FIG. 3c-5. In other words, the error angle at which the thyristors are fired includes a discrete number of angular increments of error angle (0°, 60° or 120°) depending upon the binary values of the higher order or most significant bits of error signal ES, plus an angular remainder determined by the lower order bits of error signal ES. Thus, the most significant bits of error signal ES are responsible for the angular range within which thyristors 1-6 are fired and the least significant bits of the error signal ES are responsible for the timing of the thyristor fires within the selected angular range.

The above described relationship between the window signals R through W, the firing time control signal FT, the thyristor firing signals, and the a-c input voltages are shown, for various combinations of error signal bits ESB9 and ESB10, in FIGS. 4a, 4b and 4c. In each of the latter figures, it is assumed for the sake of discussion that the error angle contribution of the least significant bits of the error signal (β') is approximately 60°, i.e., that error counter section 57-1 is nearly filled with 1's. It will be understood, however, that if the error angle contribution of the least significant bits of the error signal is less than 60°, the thyristor firing waveforms shown in FIGS. 4a through 4c will be shifted to he right by a corresponding angle.

Referring to FIG. 4c, there is shown the condition which exists when error signal bits ESB9 and ESB10 are both 0's. The first six waveforms of FIG. 4c show the window signal voltages which appear at hex-buffer outputs 86a' through 86f' under the assumed condition. In addition, the waveform labeled FT indicates the occurrence times of the firing time control pulses for the assumed 60° and value of β'. The waveforms labeled 30-1 through 30-6 show the thyristor firing pulses which are applied to thyristors 1-6 through output control network 70-3 and gate amplifiers 30-1 through 30-6 respectively. Lastly, FIG. 4c shows a-c input voltage waveforms $V_{AB}$, $V_{BC}$ and $V_{CA}$.

Referring more particularly to firing time control pulse FT1 of FIG. 4c, it will be seen that pulse FT1 occurs within the firing window of window signals R and S, i.e., during the time that window signals R and S at the b' and d' outputs of hex-buffer 86 are in the low states. Under this condition, thyristor firing signals are applied to the gate amplifiers 30-2 and 30-4 which output control network 70-3 associates with hex-buffer outputs b' and d'. As a result, thyristors 2 and 4 are fired at an error angle of nearly 60° with respect to voltage $V_{AB}$. It will be understood that the occurrence of other FT pulses within the firing windows of other sets of window signals results in the application of sets of thyristor firing pulses to the other gate amplifiers indicated in FIG. 4c, each of such sets of pulses exhibiting an error angle of approximately 60° with respect to the a-c input voltages associated therewith.

Referring to FIG. 4b, there is shown the condition which exists if firing pulse FT1 occurs when error signal bits ESB9 and ESB10 are 1 and 0, respectively, rather than 0 and 0 as in FIG. 4c. In FIG. 4b, firing time pulse FT1 has the same position with respect to the voltage $V_{AB}$ as pulse FT1 in FIG. 4c. Because, however, the states of bits ESB9 and ESB10 enable hex-buffer 84 rather than hex-buffer 86, as in FIG. 4c, and because the window signals R through W are applied to the inputs of hex-buffer 84 in a different order than that in which they are applied to the inputs of hex-buffer 86, pulse FT1 in FIG. 4b occurs during the time that the window signals R and S at the c' and d' outputs of hex-buffer 84 are in their low states. Under this condition, thyristor firing signals are applied to the gate amplifiers 30-3 and 30-4 which output control network 70-3 associates with hex-buffer outputs c' and d'. Thus, the change in bits ESB9 and ESB10 from their 00 state to their 10 state causes pulse FT1 in FIG. 4b to fire a thyristor pair (3-4) which occurs one step later in the thyristor firing sequence than the thyristor pair (2-4) which it fires under the condition shown in FIG. 4c.

FIG. 4b also shows that pulse FT1', which occurs 60° earlier than pulse FT1, occurs during the low states of window signals R and W at the b' and d' outputs of hex-buffer 84 and, consequently, fires thyristors 2 and 4. It will, therefore, be seen that the change of bits ESB9 and ESB10 from their 00 state to their 10 state effectively causes thyristors 2 and 4 to fire 60° earlier in FIG. 4b than in FIG. 4c. It will be understood that the remaining thyristor firings of FIG. 4b are similarly advanced by 60° as a result of the change in bits ESB9 and ESB10 from their 00 to their 01 states. Thus, FIG. 4b shows that the 01 state of the most significant bits of error signal ES corresponds to an error angle of 60° which, together with the approximately 60° error angle contribution of least significant bits ESB1-8, results in the 120° error angle shown in FIG. 4b.

Referring to FIG. 4a, there is shown the condition which exists if pulse FT1 occurs when error signal bits ESB9 and ESB10 are 0 and 1, respectively, rather than 0 and 0 as shown in FIG. 4c. In FIG. 4a, pulse FT1 has the same position with respect to voltage $V_{AB}$ as pulse FT1 in FIG. 4c. Because, however, the states of bits ESB9 and ESB10 enable hex-buffer 82 rather than hex-buffer 86, as in FIG. 4c, and because the window signals R through W are applied to the inputs of hex-buffer 82 in a different order than that in which they are applied to the inputs of hex-buffer 86, pulse FT1 in FIG. 4a occurs during the time that the window signals R and S at the c' and e' outputs of hex-buffer 82 are in their low states. Under this condition, thyristor firing signals are applied to the gate amplifiers 30-3 and 30-5 which output control network 70-3 associates with hex-buffer outputs c' and e'. Thus, the change in bits ESB9 and ESB10 from their 00 to their 10 state causes pulse FT1 in FIG. 4a to fire a thyristor pair (3-5) which occurs two steps later in the thyristor firing sequence than the thyristor pair (2-4) which it fires under the condition shown in FIG. 4c.

FIG. 4a also shows that pulse FT", which occurs 120° earlier than pulse FT1, occurs during the low states of window signals V and W at the b' and d' outputs of hex-buffer 82 and, consequently, fires thyristors 2 and 4. It will, therefore, be seen that the change of bits ESB9 and ESB10 from their 00 state to their 10 state effectively causes thyristors 2 and 4 to fire 120° earlier in FIG. 4a than in FIG. 4c. It will be understood that the remaining thyristor firings of FIG. 4a are similarly advanced by 120° as a result of the change in bits ESB9 and ESB10 from their 00 to their 10 states. Thus, FIG. 4a shows that the 10 state of the most significant bits of error signal ES corresponds to an error angle of 120° which, together with the approximately 60° error angle contribution of least significant bits ESB1-8, results in the 180° error angle shown in FIG. 4a.

In view of the foregoing, it will be seen that the relationships of firing time signals FT and input voltage waveforms $V_{AB}$, $V_{BC}$ and $V_{CA}$ are the same in FIGS. 4a, 4b and 4c and that the sequence in which thyristors 1 through 6 are fired is the same in FIGS. 4a, 4b and 4c. It will also be seen that the three different combinations of the most significant bits of error signal ES cause the selection of one of the three possible phase positions for the thyristor firing sequence in relation to the a-c input voltages. Lastly, it will be seen that each of these three phase positions define a 60° angular range within the thyristor firing time is determined by the least significant bits of error signal ES.

To the end that the firing pattern information produced by firing window generator 70-1 and angular range control network 70-2 may be combined with the firing time information produced by firing time control network 66 to generate the desired thyristor firing signals, the circuit of FIG. 2 includes an output network 70-3. In the present embodiment, output control network 70-3 includes hex-inverting buffer packages 88 and 90 which may be of the type sold by RCA under the designation CD4049. Each of the latter packages includes six inverter devices having respective inputs a through f and having respective outputs a' through f'. Output control network 70-3 also includes a hex D-type flip-flop package 92 which may be of the type sold by National Semiconductor under the designation MM74C174. The latter package includes six D-type flip-flops each having respective data inputs a through f, respective non-inverting or Q outputs a' through f', a positive-transition responsive clock input CL and a negative-transition responsive reset input R. In the circuit of FIG. 2, the inputs of package 92 are connected to the similarly lettered outputs of package 88 and the outputs of package 92 are connected to the similarly lettered inputs of package 90 to assure that the a through f inputs of network 70-3 are associated with thyristors 1 through 6, respectively.

The operation of output control network 70-3 will now be described. As previously described, networks 70-1 and 70-2 apply to the inputs of network 70-3 one of three possible thyristor firing patterns, each pattern including six signals which define both the desired thyristor firing sequence and respective ranges of angular positions with respect to the a-c input. These six signals are applied, through hex-inverter 88 to the respective data inputs of the flip-flops of package 92. Upon the occurrence of the positive transition of firing time control signal FT at the clock input CL of package 92, these six signals are transferred to the corresponding outputs of package 92 and, upon inversion in hex-inverter package 90, are applied as low state signals to gate amplifiers 30-1 through 30-6 to fire a selected pair of thyristors. As will be described more fully presently, these thyristor firing pulses continue to be applied until the time that the flip-flops are cleared by the low state transition of reset signal RST from reset logic network 78. Thus, the thyristors which are fired are determined by the selected firing pattern signals from networks 70-1 and 70-2 and the firing time is determined by the firing time signal FT from network 66.

After each thyristor firing, it is necessary that the circuitry of the invention be restored to a condition in which it can respond to later occurring pattern and timing information. When, for example, a pair of firing pulses has been applied to the thyristors it is necessary that the flip-flops of output network 70-3 be restored to a condition in which they can receive new information. Similarly, flip-flop 80 of firing time control network 66 must be restored to a condition in which it can receive new information from comparator 79. To the end that these functions may be accomplished there is provided herein reset logic network 78.

In the present embodiment, reset network 78 includes a counter 93 which may comprise a 7 stage binary counter of the type manufactured by RCA under the designation CD4024. Counter 93 is provided with a clock input CL which is responsive to negative-going signal transitions, a reset input R which is responsive to positive-going transitions and an output 93x for establishing a positive-going output pulse having a frequency 1/32nd of that of the clock signal at input CL. Reset network 78 also includes a two input NAND gate 94, a two input NAND gate 96, an inverter 98 and a NOR gate 100. As will be described more fully presently, these devices cooperate to not only generate the desired reset signal RST, but also serve to determine the duration of the thyristor firing pulses.

The operative sequence of reset network 78 begins when firing time control signal FT assumes its high state to indicate the arrival of the thyristor firing time. After this occurs, counter 93 begins to count the positive transitions of clock signal CK from flip-flop 44 of reference oscillator 40. After 32 such counts, output 93x of counter 93 assumes its high state and thereby causes a high state voltage to appear at the output of NAND gate 96. The latter transition comprises reset signal RST and initiates several circuit activities.

Firstly, the reset signal RST resets flip-flop 80 to its zero state to condition it for the new firing information from comparator 79. Secondly, reset signal RST is applied through NOR gate 100 to clear the flip-flops of output network 70-3 to prepare the same for the receipt of new thyristor firing information. In so doing, reset signal RST terminates the firing signals to thyristors 1-6 and thereby limits the duration of those firing signals to 32 counts of clock signal CK (or signal CK/2). Thirdly, reset signal RST, by clearing flip-flop 80 of network 66, causes signal FT to clear counter 93 and thereby prepare that counter for a new cycle of 32 counts, which cycle will begin with the next occurring high state condition of signal FT.

In addition to participating in the above described resetting operation, NOR gate 100 also serves to disable the flip-flops of output control network 70-3 in the presence of the high state of the power up signal PUP. In this manner, NOR gate 100 prevents firing signals from being applied to thyristors 1 through 6 until power up signal PUP assumes its low state to indicate that the sufficient time has elapsed for the circuit of FIGS. 1 and 2 to have settled into desirable operating posture after the turn-on thereof.

Also applied to reset network 78 is an over current signal OC which may be utilized to inhibit the firing of thyristors 1-6 when the armature current exceeds a predetermined maximum value for more than a predetermined maximum time. Over-current signal OC, when present, applies a low state signal to gate 96 and thereby resets the flip-flops of package 92 in the manner previously described in connection with counter 93. It will be understood that if no such overcurrent protection is necessary, gate 96 and inverter 98 may be eliminated and counter output 93x may be connected directly to NOR gate 100. The latter gate may also be replaced by an inverter if it is found that the circuitry does not require the protection provided by power up signal PUP.

Figure 5A:
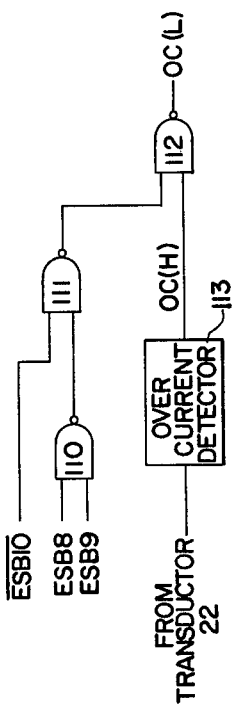

For most applications, it is desirable that overcurrent signal OC be effective to prevent the firing of thyristors 1-6 only during the monitoring condition, i.e., when the error angle is greater than or equal to 90°. This is because it is desirable to maintain firing signals to the thyristors to prevent thyristor failure (as a result of energy stored in the motor inductance) during the inverting condition. One circuit which is able to restrict signal OC to occurring only during the motoring condition is shown in FIG. 5a. Referring to the latter figure, there are shown two input NAND gates 110, 111 and 112 together with any suitable overcurrent detector circuit 113 which is responsive to the current in the armature of motor 12. In operation, error signal bit ESB10 is low to enable gate 112 when the error angle is from 120° to 180°. In addition, error signal bits ESB8 and ESB9 are both high to enable gate 112 when the error angle is between 90° and 120°. Under all other conditions, gate 112 is disabled from establishing the active (low) state of overcurrent signal OC. Thus, the circuit of FIG. 5a may be coupled to reset network 78 to restrict the motor operating region over which an overcurrent condition can assume control of the circuit of the invention.

In accordance with an important feature of the present invention, the transitions between different combinations of error signal bits ESB9 and ESB10 is coordinated with the maximum and minimum values of error signal bits ESB1-8 so as to provide smooth transitions, in both directions, between adjacent angular ranges. This coordination assures that, from the viewpoint of the controlled rectifier network 14, the angle at which firing signals are applied to network 14 varies in a smooth continuous manner from 0° to 180°. Assuming, as shown in FIGS. 4b and 3b, that the error angle is just under 120°, least significant bits ESB1-8 will have the values 11111111 and most significant bits ESB9 and ESB10 will have the values 1 and 0, respectively. If, under these conditions, the feedback signal should cause error counter 57 to count upwards by only 1 additional count, the least significant bits ESB1-8 will assume the values 00000000 and most significant bits ESB9 and ESB10 will have the values 0 and 1, respectively, causing the error angle to increase to a value just in excess of 120°. Thus, an increase by only one least significant bit in the binary value of error signal ES causes the firing of thyristors 1-6 to shift smoothly from the leftmost portion of the 60°-120° angular range shown in FIG. 4b to the right most portion of the 120°-180° angular range shown in FIG. 4a.

Similarly, given the last named condition, a decrease by only 1 least significant bit in the binary value of error signal ES will cause the firing of thyristors 1-6 to shift smoothly from the right-most portion of the 120°-180° angular range shown in FIG. 4a to the left-most portion of the 60°-120° angular range shown in FIG. 4b. It will be understood that the circuit of the invention undergoes equally smooth transitions in either direction between the adjacent 60° angular ranges shown in FIGS. 4b and 4c. The error signal values which define the boundaries between these different angular ranges are summarized in the table of FIG. 3b.

FIGS. 5 THROUGH 7

Referring to FIG. 5, there are shown exemplary embodiments of the circuits shown in block form as polarity sensing network 54 and summing and absolute value network 52 in FIG. 1. The circuit of FIG. 5 includes three operational amplifiers 102, 104 and 106 together with their respective input, output and feedback resistors and diodes. The circuit of FIG. 5 may also include a compensation network, including a resistor 102J and a capacitor 102K which together provide lead compensation for the reactance of the motor in a manner well-known to those skilled in the art. Each of the above operational amplifiers may comprise devices of the type sold by National Semiconductor under the designation LM301.

In the circuit of FIG. 5, summing and absolute value network 52 includes amplifier 102 together with its negative feedback resistor 102a and diode 102b, its negative feedback resistor 102c and diode 102d, and its input resistors 102e, 102f and 102g and includes amplifier 106 together with its input resistors 106a, 106b and 106c, its clamping diode 106d and its feedback resistor 106f. Amplifier 102 serves in the manner of a summing amplifier to provide at its output 102h an analog difference signal having a magnitude and sign that is dependent upon the difference between the current command signal applied to network input 26b and the current feedback signal applied to network input 26a. When this analog difference signal is positive, diode 102d conducts to apply that signal, through resistor 106a, to the non-inverting input of amplifier 106, to establish a positive analog control voltage at output 106h of amplifier 106. When, on the other hand, this analog difference signal is negative, diode 102b conducts to apply that signal, through resistor 106b, to the inverting input of amplifier 106 to again establish a positive analog control voltage at the output 106h of amplifier 106. Thus, amplifiers 102 and 106, together with their associated resistors and diodes, serve to establish at network output 52x an analog control signal indicative of the absolute value of the difference between the command and feedback signals.

In the present embodiment, the negative feedback path for amplifier 106 includes not only resistor 106f, but also resistor 56a, variable resistor 56b and part of the VCO portion of the previously mentioned CD4046 phase lock loop device of RCA. More particularly, feeding back from pin 10 of the phase lock loop device (rather than from amplifier output 106h) effectively closes the amplifier feedback loop beyond the point at which the temperature dependent gate voltage of the input fets of the CD4046 device have their effect. This, in turn, eliminates the effect of temperature variations on the bias for the VCO and assures that error oscillator 56 can operate down to zero frequency when the analog difference signal falls to zero. Making resistor 56b variable allows the gain of the circuitry of the invention, i.e., the number of error oscillator pulses per volt of analog difference signal, to be adjusted to any suitable value.

In the circuit of FIG. 5 polarity sensing network 54 includes operational amplifier 104 together with its feedback resistor 104a, its output resistor 104b and its input resistor 104c. Amplifier 104 serves to generate the directional control signal which controls the up/down direction of counting in error counter 57. More particularly, when the output of summing amplifier 102 is positive, the output of amplifier 104 is driven in the negative direction to provide the desired low state output voltage at polarity sensing network output 54x. When, on the other hand, the output of summing amplifier 102 is negative, the output of amplifier 104 is driven in the positive direction to provide the desired high state output voltage at polarity sensing network output 54x. Thus, polarity sensing network output 54x is in its high state when the feedback signal magnitude is greater than the command signal magnitude and is in its low state when the command signal magnitude is greater than the feedback signal magnitude.

In the course of the above described polarity sensing activity, positive feedback resistor 104a provides the regenerative characteristic which assures that the output voltage of amplifier 104 has the desired two-state form. Selection of a suitable magnitude for resistor 104a also allows selective control over the degree of hysterisis exhibited by amplifier 104. Resistor 104d serves to provide a voltage offset which converts the + or −12 volt voltage levels generated by amplifier 104 to +12 and 0 volt levels suitable for application to the remaining circuitry.

As previously described, inhibit logic network 64 of FIG. 1 serves to prevent error oscillator 56 from changing the count of counter 57 when the error angle attempts to vary outside of the angular limits 180° and 0°, these conditions corresponding to error signals having binary values greater than 10/11111111 or less than 00/00000000, respectively. as shown in FIG. 3b. To the end that this may be accomplished, inhibit logic network 64 includes (as shown in FIG. 6) a three-input NAND gate 108, two two-input NAND gates 110 and 112 and inverters 114 and 116. As will be described more fully presently, gates 108 and 110 cooperate to impose the upper angular limit by disabling flip-flop 62 when the error angle attempts to assume a value greater than 180°, i.e., when error signal ES attempts to exceed the value 10/11111111. In addition, gates 110 and 112 cooperate to impose the lower angular limit by disabling flip-flop 62 when the error angle attempts to assume a less than 0°, i.e., when error signal ES attempts to drop below the value 00/00000000.

When error signal ES assumes the value 00/00000000 the signal at EC2, the carry output of error counter section 57-2, assumes its low state and is inverted by inverter 114 to apply a high state signal to one input of gate 112. If, during this time, the Q output of flip-flop 60 is in its high state, indicating that further downward counts are called for from error counter 57, a high state voltage will also appear at the other input of gate 112. The latter condition causes a low state voltage to appear at the output of gate 112 and thereby causes a high state voltage to appear at the output of gate 110. Under this condition, flip-flop 62 will be inhibited from applying pulses to error counter 57 until the direction of counting therein reverses. Thus, error signal ES cannot assume a value less than 00/00000000 and the error angle cannot assume a value less than 0°.

A similar approach might be utilized to inhibit error oscillator 56 under the condition in which the error angle attempts to exceed 180°, except for the fact that under that condition error signal bits ESB1-8 are all 1's while bit ESB9 is a 0 and bit ESB10 is a 1. In order to inhibit flip-flop 62 in the presence of the last named conditions, one input of gate 108 is supplied with bit ESB10 which is high only when error signal ES is in its highest range. In addition, a second input of gate 108 is connected to the $\overline{Q}$ output of flip-flop 60, which output is high only when error counter 57 is counting upwardly. Lastly, the third input of gate 108 is connected to receive the signal at EC1, the carry output of error counter section 57-1, through an inverter 116, and is high each time that counter section 57-1 contains all 1's. Since the above three conditions coincide only when error signal ES is at its maximum value, it will be seen that gate 108 goes low to inhibit flip-flop 62 only when the error angle attempts to exceed 180°, and will continue to inhibit flip-flop 62 until there occurs a reversal of the direction of counting in error counter 57. Thus, error signal ES cannot assume a value greater than 10/11111111 and the error angle cannot assume a value greater than 180°.

Figure 7:
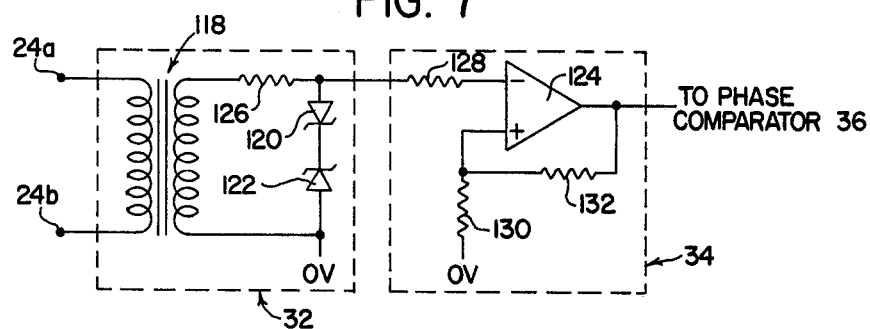

Referring to FIG. 7, there are shown exemplary embodiments of circuits which are suitable for use as amplitude limiting network 32 and waveshaping network 34 of FIG. 1. Amplitude limiting circuit 32 includes a suitable isolation transformer 118, Zener diodes 120 and 122 and a current limiting resistor 126. In operation, diodes 120 and 122 clip respective half-cycles of the a-c input voltage and thereby limit the voltages applied to the input of waveshaping network 34 to values equal to the breakdown voltages of Zener diodes 120 and 122.

In the present embodiment, waveshaping network 34 includes as operational amplifier 124, input resistors 128 and 130 and a positive feedback resistor 132. Network 34 serves to convert the input signal from network 32 into a true two-state signal suitable for application to the remaining circuitry of FIGS. 1 and 2. Because of the similarity of network 34 to previously described network 54 and to Schmitt trigger circuits generally, the operation of network 34 will not be described in detail herein.

OTHER EMBODIMENTS

Referring to that portion of the circuit of the invention illustrated in FIG. 2, it should be apparent that three items of information are combined before generating the signals which are actually applied to the thyristors. These three items of information include: (1) the information which the sequencing signals provide as to the number of thyristors to be fired, (2) the information which error signal ES provides as to the selected range of error angle, and (3) the information which firing time control signal FT provides as to the firing time within the selected range of error angle. It should also be apparent, however, that it is not important whether these items of information are combined in the order described in connection with the circuit of FIG. 2, in an order different from that described in connection with the circuit of FIG. 2, or similtaneously.

Figure 8:
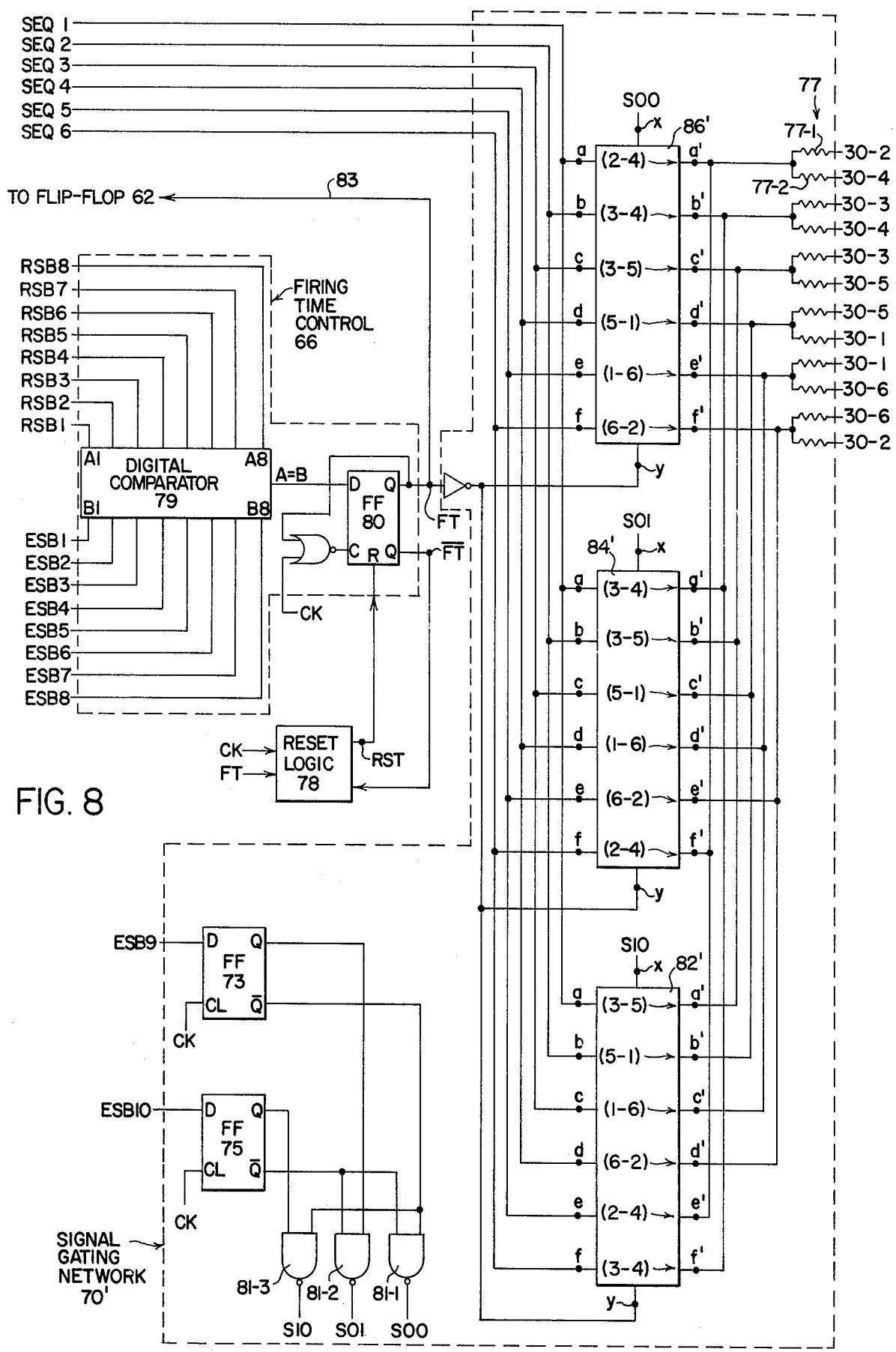
FIG. 8 is a schematic diagram of an alternative embodiment of the circuit of FIG. 2.

More particularly, in the circuit of FIG. 2, the sequencing information provided by sequencing signals SEQ1-6 is first combined with the angular range information provided by error signal bits ESB9 and ESB10 in networks 70-1 and 70-2. The result of this combination was then combined with the firing time information provided by signal FT in network 70-3. These three items of information can, however, be combined in any desired order, or can be combined all at the same time. One circuit suitable for combining all three items of information at the same time is illustrated in FIG. 8. In the circuit of FIG. 8, signals which are the same as those referred to in FIG. 2 are similarly lettered, and circuit devices which are the same as those referred to in FIG. 2 are similarly numbered.

Referring to FIG. 8, there is shown a signal gating network 70' which serves the combined functions of firing window network 70-1, range control network 70-2 and output control network 70-3 of FIG. 2. In the present embodiment, signal gating network 70' includes three hex-state inverting buffer devices 86', 84' and 82' which are the same as devices 86, 84 and 82 of FIG. 2 except that devices 86', 84' and 82' provide state inversions between their inputs $a$ through $f$ and their corresponding outputs $a'$ through $f'$. Gating network 70' also includes D-type flip-flops 73 and 75 which serve the same functions as inverters 67 and 69 of FIG. 2, except that synchronization with clock signal CK is provided in FIG. 8. Lastly, gating network 70' includes three two-input NAND gates 81-1, 81-2 and 81-3 which together serve as a decoder to provide from error signal bits ESB9 and ESB10 one of three signals S00, S01 and S10 for selecting a respective one of the desired angular ranges of error angle.

Because of the substantial underlying similarity of the operation of the circuits of FIGS. 2 and 8, the circuit of FIG. 8 is most easily understood by considering the ways in which its operation differs from that of the circuit of FIG. 2. Firstly, the decoding of error signal bits ESB9 and ESB10 into three non-overlapping signals S00, S01, and S10 allows the desired range of error angle to be selected by applying signals S00, S01 and S10 to respective ones of the two disable inputs of hex-buffers 86', 84' and 82', in this case the X inputs. This leaves the other, or Y input of each hex-buffer free for use in imposing another independent condition on the operation of the hex-buffers. In the circuit of FIG. 8, this independent condition is supplied by firing time signal FT, which signal is applied (in inverted form) to the Y disable inputs of each hex-buffer. As a result of this connection, thyristor firing signals can only appear at the outputs of the one hex-buffer which is enabled by signals S00 through S10, and can only appear during the time that signal FT is present. Thus, the circuit of FIG. 8 does not require a separate output gating network such as network 70-3 in FIG. 2.

Another difference between the circuit of FIG. 8 and that of FIG. 2 is that the circuit of FIG. 8 is arranged to fire the thyristors as pairs, using a resistor summing configuration. Output $a'$ of hex-buffer 86', for example, is connected both to gate amplifier 30-2 through a resistor 77-1 and to gate amplifier 30-4 through a resistor 77-2. As a result, the appearance of a firing signal at hex-buffer output 86'$a'$ causes the firing of both thyristor 2 and thyristor 4. Similarly, the appearance of a firing signal at buffer output 86'$b'$ causes the firing of thyristors 3 and 4. In general, each of the six outputs of each buffer is associated with the firing of one of the six pairs of thyristor firings which define a complete firing sequence. The advantage of this firing scheme is that the recurrent sequence of six pairs of thyristor firings per cycle can be imposed by the direct application of sequencing signals SEQ1-6 to buffer inputs $a$ through $f$, thereby eliminating a window generator network such as network 70-1 of FIG. 2.

In order to assure that the selection of one of the three hex-buffer devices results in the establishment of the proper one of the three desied ranges of error angle, the order in which the hex-buffer inputs are connected to receive signals SEQ1-6 and the order in which the hex-buffer outputs are connected to output resistor pairs 77 should be chosen with care. While there are a number of possible combinations of input and output connections which will provide the desired result, the combination of connections shown in FIG. 8 is preferred for its straightforwardness. In the circuit of FIG. 8, similarly lettered hex-buffer inputs are connected in parallel, i.e., to receive the same sequencing signal. The outputs of the hex-buffers, however, are connected so that the hex-buffer outputs which are to fire the same thyristor pair are connected in parallel. The association of particular hex-buffer outputs with the firing of particular thyristor pairs is shown by the pairs of parenthetical numbers appearing within hex-buffer blocks 86', 84' and 82' in FIG. 8. It will be understood that this combination of input and output connections will produce the same sequence of thyristor firings which was described previously in connection with FIGS. 4a through 4c.

One final difference between the circuit of FIG. 8 and the circuit of FIG. 2 is the presence of a conductor 83 in FIG. 8. This conductor serves to inhibit flip-flop 62 when firing time signal FT is in its true or firing state. By so doing, conductor 83 serves to coordinate signal FT with changes in the state of error signal bits ESB9 and ESB10, so that the range of error angle does not change during the time that a pair of thyristors is being fired. Thus, conductor 83 serves a synchronizing function which prevents the generation of thyristor firing signals of less than the desired width.

In view of the foregoing it will be seen that the present invention is not limited to a particular order for combining the sequencing information conveyed by signals SEQ1-6, the angular range information conveyed by the most significant bits of error signal ES and the firing time information conveyed by signal FT. Thus, network 70' of FIG. 8 and network 70 (70-1 + 70-2 + 70-3) of FIG. 2 are merely two illustrative examples of the signal generating means contemplated by the present invention.

As previously described, the circuit of the invention can be used to control the operation of a motor, over the full motoring and full inverting range thereof, for a wide variety of a-c input and controlled rectifier configurations. The adaptation of the circuit of the invention to control representative ones of these other configurations will now be briefly described.

One of the other possible a-c input and controlled rectifier configurations includes a six phase a-c input voltage and a six-phase full wave controlled rectifier network. In such a configuration, the firing sequence of the controlled rectifier network includes twelve thyristor firing events for each full cycle of the a-c input voltage. As a result, the interval between successive thyristor firing events is, under steady state conditions, equal to 360° divided by 12 or 30° of the a-c input voltage. Since, in addition, the desired range of motor control extends over 180°, the number of ranges of error angle necessary to provide the full range of motoring-inverting control is equal to 180° divided by 30° or six. Thus, a six phase full wave input configuration which is accomodated by the circuit of the invention calls for six 30° ranges of error angle.

In modifying the circuitry of the invention to provide six 30° ranges of error angle, only straightforward circuit modifications are necessary. Firstly, the frequency division relationships of reference counter 42 and decoder 44 should be changed so that decoder 44 provides a sequence of twelve output states and so that reference counter 42 cycles through its counting sequence during each of these twelve decoder states. Secondly, the number of outputs of error counter section 57-2 which are used should be increased by one to provide the six combinations of the most significant bits of error signal ES which will provide the desired six ranges of error angle, these six combinations of most significant bits including 000, 001, 010, 011, 100 and 101. Lastly, if the signal gating network configuration of FIG. 8 is utilized, the number of hex-buffers should be increased to 12 (6 pairs of 6 input hex-buffers with an effective 30° phase shift between pairs) to accomodate the greater number of thyristors and the greater number of firing events per cycle. In addition, the decoder network should be expanded to include six, three-input NAND gates for establishing the desired six angular range selection signals. Since the showing of these modifications would only depict circuitry of a type which is already illustrated in the existing drawings, this embodiment of the invention is not illustrated therein.

It will be understood that other a-c input and controlled rectifier configurations can also be readily accomodated by modifying the circuitry shown in FIGS. 1, 2 and 8 in a manner analogous to that just described in connection with the six-phase full-wave embodiment. Thus, the circuitry of the invention is not limited to a particular number of phases in the a-c input and is not limited to any particular number of thyristors.

In view of the foregoing, it will be seen that a circuit constructed in accordance with the invention embodies an improved control for a motor, that this control extends over the entire motoring and inverting range of motor operation and that this control eliminates the need for providing separate control circuitry for each thyristor firing event in the thyristor firing sequence. It will also be seen that the circuitry of the invention utilized an angular range selection technique that is sufficiently powerful that it readily accomodates a variety of a-c input and controlled rectifier configurations. Lastly, it will be seen that the circuitry of the invention provides a smooth accurate and stable control function which affords any necessary degree of angular resolution.

It will be understood that the above described embodiments of the invention have been shown for illustrative and descriptive purposes only and that the true scope of the present invention may be determined only to the appended claims.

What I claim is:

1. A digital d-c motor control circuit comprising:
   an a-c input for connection to an a-c source,
   a d-c output for connection to a motor,
   a controlled rectifier circuit for controlling the flow of power between the a-c input and the d-c output,
   a firing control circuit for applying firing signals to the controlled rectifier circuit to control the magnitude and direction of power flow therethrough, said firing control circuit including:
   (a) reference signal generating means for generating a periodic digital reference signal having at least eight bits, the reference signal being maintained in a predetermined phase and frequency relationship to the voltage at the a-c input,
   (b) error signal generating means for generating a digital error signal having a digital value which varies in accordance with the difference between a command signal indicative of the desired value of a motor variable and a feedback signal indicative of the actual value of that motor variable, the error signal having at least two more higher order bits than the reference signal,
   (c) means for applying firing signals to the controlled rectifier circuit within angular ranges determined by said at least two more higher order bits and substantially at times determined by the remaining bits of the error signal and the digital reference signal,
   whereby the digital control circuit may control the operation of a motor over both the monitoring and inverting ranges thereof.

2. A digital d-c motor control circuit as set forth in claim 1 wherein the error signal generating means includes a voltage controlled oscillator responsive to the magnitude of the difference between the command signal and the feedback signal, an up/down counter, means for connecting the voltage controlled oscillator to the up/down counter to control the counting frequency thereof, and means for controlling the up/down direction of counting in said up/down counter in accordance with the sign of the difference between the command signal and the feedback signal.

3. A digital d-c motor control circuit as set forth in claim 1 wherein the reference signal generating means includes a voltage controlled oscillator, a digital phase comparator, a reference counter, and decoding means for generating a plurality of sequencing signals, the number of sequencing signals being equal to the desired number of controlled rectifier firing events during each full cycle of the a-c input voltage, and means for connecting the oscillator, comparator, counter and decoding means together, in a phase locked loop configuration, to assure that the reference signal established by the reference counter and the sequencing signals established by the decoding means are maintained in a predetermined frequency and phase relationship to the voltage at the a-c input and to each other.

4. A digital d-c motor control circuit as set forth in claim 3 wherein the means for applying firing signals to the controlled rectifier circuit includes comparing means for comparing the reference signal to said remaining bits of the error signal to provide a timing signal indicative of the times, within said angular ranges, at which firing signals are to be applied to the controlled rectifier circuit.

5. A digital d-c motor control circuit as set forth in claim 4 wherein the means for applying firing signals to the controlled rectifier circuit includes firing window generating means for generating firing window signals from the sequencing signals, angular range control means for combining the information carried by the firing window signals with the information carried by said at least two more higher order bits to generate a firing pattern signal, and output control means for combining the timing signal with the firing pattern signal to provide firing signals for the controlled rectifier circuit.

6. A digital motor control circuit as set forth in claim 4 wherein the means for applying firing signals to the controlled rectifier circuit includes a plurality of tri-state buffer networks each having a plurality of signal inputs, a plurality of signal outputs and at least two control inputs, means for applying the sequencing signals to the signal inputs of the buffer networks, means for connecting the signal outputs of the buffer networks to the controlled rectifier circuit, means for applying at least one of said at least two more higher order bits to one control input of each buffer network and means for connecting the comparing means to the other control input of each buffer network.

7. A digital d-c motor control circuit as set forth in claim 1 including means for limiting the error angle between the firing signals and the voltage at the a-c input to values which are equal to or in excess of zero degrees and which are equal to or less than 180°.

8. A digital d-c motor control circuit as set forth in claim 1 including means for inhibiting increases in the value of the error signal when the error signal attempts to increase above a value corresponding to an error angle of 180° and means for inhibiting decreases in the value of the error signal when the error signal attempts to decrease below a value corresponding to an error angle of zero degrees.

9. A digital d-c motor control circuit as set forth in claim 1 including means for preventing the application of firing signals to the controlled rectifier circuit when the feedback signal exceeds a predetermined excessive value and when the error signal has a value which indicates that the error angle is between 90° and 180°.

10. A digital d-c motor control circuit as set forth in claim 1 wherein the reference signal varies through its cycle n times during each cycle of the voltage at the a-c input, n being a number equal to the desired number of controlled rectifier firing events during each cycle of the voltage at the a-c input.

11. A digital d-c motor control circuit comprising:
an a-c input for connection to an a-c source,
a d-c output for connection to a motor,
a plurality of thyristors for controlling the flow of power between the a-c input and the d-c output,
a firing control circuit for applying firing signals to the thyristors and thereby determining the magnitude and direction of power flow therethrough, said firing control circuit including:
(a) reference signal generating means for generating a periodic digital reference signal that is locked in phase with the voltage at the a-c input, the reference signal having a digital value which varies from a first preselected value to a second preselected value n times during each full cycle of the voltage at the a-c input, n being an integer greater than 1,
(b) means for generating an error signal having a digital value which varies in accordance with the time accumulated difference between a command signal indicative of the desired value of a motor variable and a feedback signal indicative of the actual value of that motor variable, the error signal including a plurality of lower order bits equal in number to the number of bits of the reference signal and including at least two higher order bits,
(c) means for applying firing signals to the thyristors within angular ranges determined by the higher order bits of the error signal and at times when the lower order bits of the error signal are substantially equal to those of the reference signal, whereby the digital control circuit may control the operation of a motor over both the motoring and inverting ranges thereof.

12. A digital d-c motor control circuit as set forth in claim 11 including means for limiting the error angle between the firing signals and the voltage at the a-c input to values which are equal to or in excess of zero degrees and which are equal to or less than 180°.

13. A digital d-c motor control circuit as set forth in claim 11 including means for inhibiting increases in the value of the error signal when the error signal attempts to increase above a value corresponding to an error angle of 180° and means for inhibiting decreases in the value of the error signal when the error signal attempts to decrease below a value corresponding to an error angle of zero degrees.

14. A digital d-c motor control circuit as set forth in claim 11 including means for preventing the application of firing signals to the thyristors when the feedback signal exceeds a predetermined excessive value and when the error signal has a value which indicates that the error angle is between 90° and 180°.

15. A digital d-c motor control circuit comprising:
an a-c input for connection to an a-c source,
a d-c output for connection to a motor,
a plurality of thyristors for controlling the flow of power between the a-c input and the d-c output,
a firing control circuit for applying firing signals to the thyristors and thereby determining the magnitude and direction of power flow therethrough, said firing control circuit including:
(a) reference signal generating means for generating a periodic digital reference signal having at least eight bits, the reference signal being maintained in a predetermined frequency and phase relationship with respect to the voltage at the a-c input and having a period equal to 360° of the a-c input voltage divided by an integer n equal to the number of thyristor firings which are to occur during each 360° of the a-c input voltage,
(b) means for generating an error signal having a digital value which varies in accordance with the difference between a command signal indicative of the desired value of a motor variable and a feedback signal indicative of the actual value of that motor variable, the error signal including a plurality of lower order bits equal in number to the number of bits of the reference signal and including sufficient higher order bits to allow the provision of at least $n/2$ increments of error angle, and
(c) means for applying firing signals to the thyristors at angles which include from 0 to $(n/2)$-1 of said angular increments, dependent upon the higher order bits of the reference signal, plus an angular remainder dependent upon the lower order bits of the error signal.

16. A digital d-c motor control circuit as set forth in claim 15 wherein the means for applying firing signals to the thyristors includes comparing means for comparing the reference signal to an equal number of the lower order bits of the error signal to fix said angular remainder.

17. A digital d-c motor control circuit a set forth in claim 15 including means for limiting the error angle between the firing signals and the voltage at the a-c input to values which are equal to or in excess of zero degrees and which are equal to or less than 180°.

18. A digital d-c motor control circuit as set forth in claim 15 including means for inhibiting increases in the value of the error signal when the error signal attempts to exceed a value corresponding to an error angle of 180° and means for inhibiting decreases in the value of the error signal when the error signal attempts to decrease below a value corresponding to an error angle of zero degrees.

19. A digital d-c motor control circuit as set forth in claim 15 including means for preventing the application of firing signals to the thyristors when the feedback signal exceeds a predetermined excessive value and when the error signal has a value which indicates that the error angle is between 90° and 180°.

20. A digital d-c motor control circuit as set forth in claim 15 wherein the width of each non-zero increment of error angle is equal to 180° divided by the number of a-c input voltage degrees occupied by the period of the reference signal.

21. A digital d-c motor control circuit as set forth in claim 15 wherein changes in the number of angular increments occur smoothly as a result of a change of one count in the lowest order bit of the error signal.

22. A digital d-c motor control circuit as set forth in claim 15 wherein the plurality of thyristors includes six thyristors connected in a three phase full wave configuration, wherein the reference signal undergoes six cycles during each cycle of the a-c input voltage and wherein the error signal is adapted to selectively establish angular increments of 0°, 60° and 120°.

23. A digital d-c motor control circuit comprising:
an a-c input for connection to an a-c source,
a d-c output for connection to a motor,
a controlled rectifier circuit for controlling the flow of power between the a-c input and the d-c output, the controlled rectifier circuit including a plurality of gate controlled switching devices,
a firing control circuit for applying firing signals to the gate controlled switching devices and thereby determining the magnitude and direction of power flow through the controlled rectifier circuit, said firing control circuit including:
(a) reference signal generating means for generating a periodic digital reference signal that is locked in phase with the voltage at the a-c input, the reference signal having an M bit digital value which varies from a first preselected value to a second preselected value n times during each full cycle of the voltage at the a-c input, M and $n$ being integers greater than one,
(b) error signal generating means for generating a digital error signal having an M + $p$ bit digital value which varies in accordance with the difference between a command signal indicative of the desired value of a motor variable and a feedback signal indicative of the actual value of that motor variable, $p$ being an integer greater than or equal to 1,
(c) firing time control means responsive to the lower M bits of the error signal and to the reference signal for generating a firing time control signal which fixes the time at which a gate controlled switching device will be gated on, and
(d) firing signal generating means responsive to the firing time control signal and to the upper $p$ bits of the digital error signal for applying firing signals to the gate controlled switching devices, the firing signal generating means utilizing said upper $p$ bits to select one of at least two possible ranges of firing angle within which firing signals will be applied to the gate controlled switching devices and utilizing said firing time control signal to fix the firing angle within the selected range.

24. A digital d-c motor control circuit as set forth in claim 23 wherein the error signal generating means includes a voltage controlled oscillator responsive to the magnitude of the difference between the command signal and the feedback signal, an up/down counter, means for connecting the voltage controlled oscillator to the up/down counter to control the counting frequency thereof, and means for controlling the up/down direction of counting in said up/down counter in accordance with the sign of the difference between the command signal and the feedback signal.

25. A digital d-c motor control circuit as set forth in claim 23 wherein the reference signal generating means includes a voltage controlled oscillator, a digital phase comparator, a reference counter, and decoding means for generating a plurality of sequencing signals, the number of sequencing signals being equal to the desired number of controlled rectifier firing events during each full cycle of the a-c input voltage, and means for connecting the oscillator, comparator, counter and decoding means together, in a phase locked loop configuration, to assure that the reference signal established by the reference counter and the sequencing signals established by the decoding means are maintained in a predetermined frequency and phase relationship to the voltage at the a-c input and to each other.

26. A digital d-c motor control circuit as set forth in claim 23 wherein the firing time control means comprises a digital comparator having one set of inputs connected to receive the reference signal and having another set of inputs connected to receive the error signal.

27. A digital d-c motor control circuit as set forth in claim 25 wherein the firing signal generating means includes firing window generating means for generating firing window signals from the sequencing signals, angular range control means for combining the information carried by the firing window signals means with the information carried by the upper p bits of the error signal to generate a firing pattern signal, and output control means for combining the firing time control signal with the firing pattern signal to provide the desired firing signals.

28. A digital d-c motor control circuit as set forth in claim 25 wherein the firing signal generating means includes a plurality of tri-state buffer networks each having a plurality of signal inputs, a plurality of signal outputs and two control inputs, means for applying the sequencing signals to the signal inputs of the buffer networks, means for connecting the signal outputs of the buffer networks to the gate controlled switching devices, means for controlling one control input of each buffer network in accordance with the upper p bits of the error signal and means for applying the firing time control signal to the other control input of each buffer network.

29. A digital d-c motor control circuit as set forth in claim 23 including means for limiting the error angle between the firing signals and the voltage at the a-c input to values which are equal to or in excess of zero degrees and which are equal to or less than 180°.

30. A digital d-c motor control circuit as set forth in claim 23 including means for inhibiting increases in the value of the error signal when the error signal attempts to exceed a value corresponding to an error angle of 180° and means for inhibiting decreases in the value of the error signal when the error signal attempts to decrease below a value corresponding to an error angle of zero degrees.

31. A digital d-c motor control circuit as set forth in claim 23 including means for deriving three non-overlapping clock signals, the first of the clock signals serving to initiate changes in the value of the reference signal, the second clock signal serving to initiate changes in the value of the error signal and the third clock signal serving to initiate the firing time control signal.

32. A digital d-c motor control circuit as set forth in claim 23 including means for preventing the application of firing signals to the gate controlled switching devices when the feedback signal exceeds a predetermined excessive value and when the error signal has a value which indicates that the error angle is between 90° and 180°.

33. A digital d-c motor control circuit comprising:
an a-c input for connection to an a-c source,
a d-c output for connection to a motor,
a plurality of gate controlled switching devices for controlling the flow of power between the a-c input and the d-c output,
a firing control circuit for applying firing signals to the gate controlled switching devices and thereby determining the magnitude and direction of power flow therethrough, said firing control circuit including:
(a) reference signal generating means for generating a periodic digital reference signal having at least eight bits, the digital reference signal being maintained in a predetermined frequency and phase relationship to the voltage at the a-c input,
(b) error signal generating means for generating an error signal having a digital value which varies in accordance with the difference between a command signal indicative of the desired value of a motor variable and a feedback signal indicative of the actual value of that motor variable, the error signal having at least two bits in excess of the number of bits comprising the reference signal,
(c) comparing means for comparing the bits of the reference signal with an equal number of the least significant bits of the error signal,
(d) means responsive to the sequencing signals, to the comparing means and to the excess bits of the error signal for applying firing signals to the gate controlled switching devices, the firing signals occurring within angular ranges determined by the excess bits of the error signal and at angles determined by the comparing means.

34. A digital d-c motor control circuit as set forth in claim 33 including means for limiting the error angle between the firing signals and the voltage at the a-c input to values which are equal to or in excess of zero degrees and which are equal to or less than 180°.

35. A digital d-c motor control circuit as set forth in claim 33 including means for deriving three non-overlapping clock signals, the first of the clock signals serving to initiate changes in the value of the reference signal, the second clock signal serving to initiate changes in the value of the error signal and the third clock signal serving to synchronize the comparing means.

36. A digital d-c motor control circuit as set forth in claim 33 wherein the reference signal varies through its cycle n times during each full cycle of the voltage at the a-c input, n being a number equal to the desired number of gate controlled switching device firing events during each cycle of the voltage at the a-c input.

* * * * *